US010757398B1

(12) United States Patent
Magoz et al.

(10) Patent No.: US 10,757,398 B1
(45) Date of Patent: Aug. 25, 2020

(54) SYSTEMS AND METHODS FOR GENERATING TEMPORALLY MULTIPLEXED IMAGES

(71) Applicant: Facebook Technologies, LLC, Menlo Park, CA (US)

(72) Inventors: Ziv Magoz, Seattle, WA (US); Jasmine Soria Sears, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/190,776

(22) Filed: Nov. 14, 2018

Related U.S. Application Data

(60) Provisional application No. 62/689,002, filed on Jun. 22, 2018.

(51) Int. Cl.
*H04N 13/341* (2018.01)
*H04N 13/167* (2018.01)

(52) U.S. Cl.
CPC ........ *H04N 13/341* (2018.05); *H04N 13/167* (2018.05)

(58) Field of Classification Search
None
See application file for complete search history.

(56) References Cited

U.S. PATENT DOCUMENTS

2013/0300637 A1* 11/2013 Smits ................ G02B 27/0176
345/8
2014/0254007 A1* 9/2014 Ma .................... G02B 27/2214
359/464

OTHER PUBLICATIONS

Sears, Jasmine Soria, "Systems and Methods for Transferring an Image to an Array of Emissive Subpixels", U.S. Appl. No. 16/292,366 dated Mar. 5, 2019, 105 pages.
Sears et al., "Systems and Methods Utilizing Rotatable Optics for Projecting Light to a Viewer", U.S. Appl. No. 16/190,758 dated Nov. 14, 2018, 94 pages.
Sears, Jasmine Soria, "Apparatus, Systems, and Methods to Compensate for Sub-Standard Subpixels in an Array", U.S. Appl. No. 16/357,853 dated Mar. 19, 2019, 102 pages.

* cited by examiner

*Primary Examiner* — Kenneth B Lee, Jr.
(74) *Attorney, Agent, or Firm* — FisherBroyles, LLP

(57) ABSTRACT

A method for generating a temporally multiplexed image to a viewer may include (1) receiving input data by a controller, (2) converting the input data by the controller into a sequence of instructions controlling at least functions of a subpixel array system and of an optical system, (3) generating subframes from the sequence of instructions which includes for each subframe: the subpixels to be illuminated at a given time and at a given position of a light deviator of the optical system that possesses at least one lateral-light-shifting degree of freedom, and (4) temporally multiplexing the subframes using the optical system, the one or more subframes designed to display an image to a viewer at the viewing region. Various other apparatus, systems, and methods are also disclosed.

21 Claims, 12 Drawing Sheets

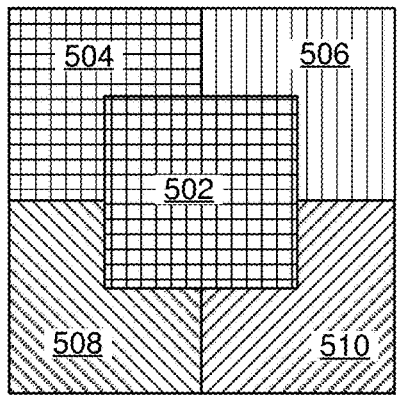
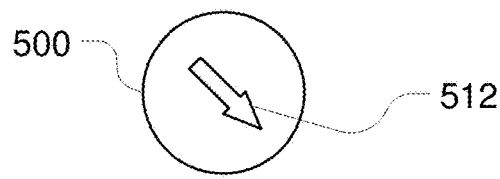
FIG. 5A
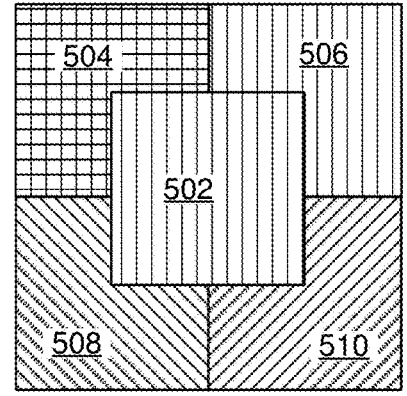
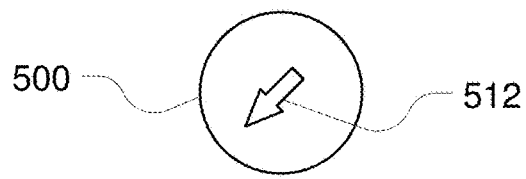
FIG. 5B
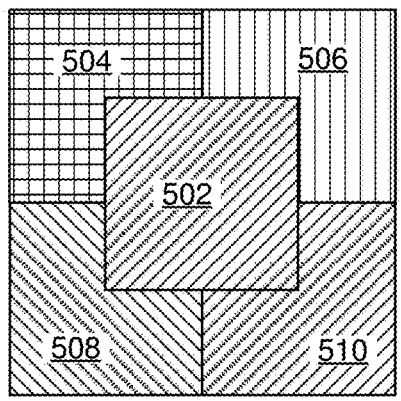
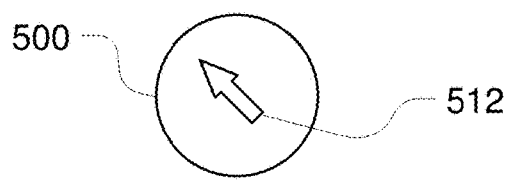
FIG. 5C
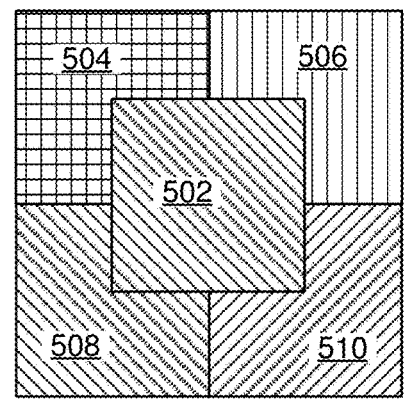
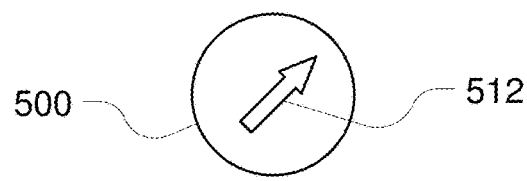
FIG. 5D 1000
FIG. 10A — 1002
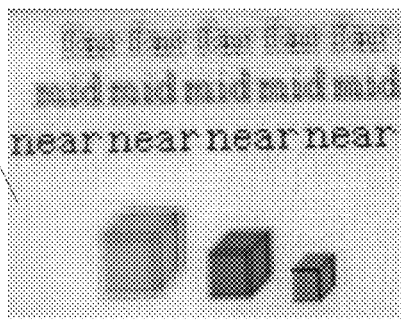
FIG. 10B — 1004
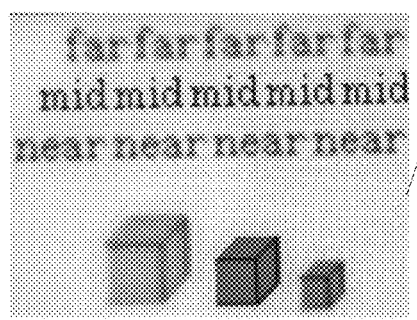
FIG. 10C — 1006
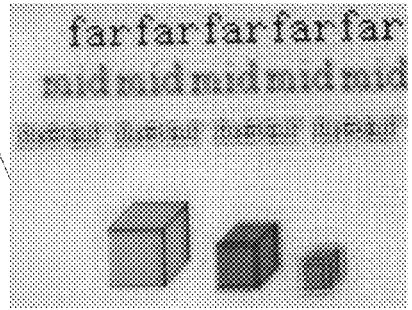
FIG. 10D — 1008
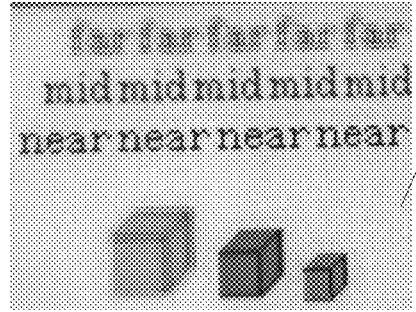
FIG. 10E — 1010
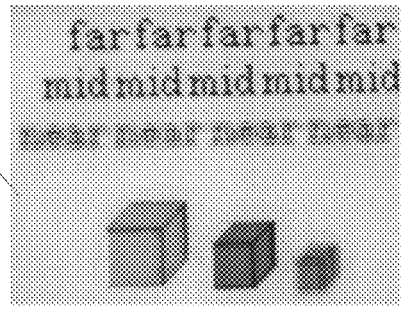
FIG. 10F — 1012

SYSTEMS AND METHODS FOR GENERATING TEMPORALLY MULTIPLEXED IMAGES

CROSS REFERENCE TO RELATED APPLICATION

This application is a non-provisional utility application which claims the benefit of U.S. Provisional Application No. 62/689,002 filed 22 Jun. 2018, the disclosure of which is incorporated, in its entirety, by this reference.

BACKGROUND

Emissive arrays produce images made up of many pixels. Such arrays commonly control the color and brightness of each pixel to present an image. A pixel is in turn often composed of multiple subpixels that emit light of differing spectral distributions. Due to its small size, a human eye typically does not perceive a subpixel individually. Instead the eye blends the light emitted from the subpixels producing the impression of a single source of light, the pixel. The color and brightness of a pixel may be controlled by varying the brightness of the underlying subpixels. For example, the underlying subpixels may produce a white pixel by illuminating with equal intensity. The underlying subpixels may produce different pixel colors by changing their relative brightness. The size of the single uniform pixel, which determines the resolution of an array, is typically equal to the sum of the sizes of its constituent subpixels and or the smallest feature that an array possibly could resolve.

Subpixel array manufacturers may typically design subpixels to emit light with the colors of red, blue, or green. These three colors may be combined to span a range of perceivable colors while minimizing the size of a pixel. However, such pixels may often be unable to reproduce colors with a wavelength greater than that of the red subpixel or a wavelength less than that of the blue subpixel. An array may produce colors outside of these color ranges using additional subpixels, at the cost of increasing the individual pixel size and loss of resolution, unless the subpixel sizes were to shrink beyond what is currently available.

SUMMARY

As will be described in greater detail below, the present disclosure describes apparatus, systems, and methods for generating a temporally multiplexed image to be viewed by a viewer. For example, a system for generating a temporally multiplexed image may include (1) an array system that includes a plurality of subpixels in the form of an array, (2) an optical system that receives light from at least one illuminated subpixel of the array system and laterally shifts that light using a light deviator, e.g., a lateral-light-shifting optic (LLSO), and then directs the shifted light towards a viewing region, and (3) a controller that receives and converts input data into a sequence of instructions that are used to generate subframes. The sequence of instructions may include predetermined values for each subpixel of an illumination time and a position of the light deviator, and the controller may temporally multiplex the subframes using the optical system, the subframes designed to display an image to a viewer at the viewing region. In some examples, the sequence of instructions may control a plurality of functions of the array system and of the optical system, the sequence of instructions for each subframe including at least a subset of subpixels of the plurality of subpixels to be illuminated at a predetermined time and at a predetermined position of the LLSO, the LLSO including at least one lateral-light-shifting degree of freedom.

The ability to shift light from one location in a subpixel array to another location in that subpixel array may be accomplished by one or more light deviators. A light deviator may possess various lateral-light-shifting degrees of freedom including one or more of rotation, tilt, pivot, and/or light reflection. These degrees of freedom and the optical design of the deviator may create, for a given subpixel in the subpixel array, a set of locations in the array to which light from that given subpixel may be laterally shifted. The shifting of the light emitted from a given subpixel to another array location of a set of locations, may be accomplished by the position of the light deviator at the time that the given subpixel produced the light. In some embodiments, each subframe may be generated from a set of illuminated subpixels at specific positions of the light deviator which may be defined by at least one of its lateral-light-shifting degrees of freedom. In some examples, a component of a position of the light deviator may be cyclical, such as in a rotational arrangement and thus the time at which a given subpixel may be illuminated may also be cyclical (or periodic).

Subframes may be formatted by the controller, in which each subframe may provide one or more objects in the image to be generated, based on the input data, that are in-focus (i.e., that are designed to be perceived by a viewer to be sharp) and/or one or more objects that are out-of-focus (i.e., that are designed to be perceived by a viewer to be out-of-focus). The image, when presented in a temporally multiplexed manner from a sequence of the subframes, creates a perception of depth to the viewer, as some objects will appear to be in-focus, i.e., sharp, and other objects will appear to be out-of-focus, i.e., blurred. Thus, depth perception may be generated from the combination of sharply defined objects and blurred object or any level of sharpness in-between. In an example, a combination of an in-focus foreground with a blurred background and this arrangement may create a perception of depth to a viewer.

In some examples, one or more subframes may be generated using a representation of a plurality of the functions of the controller: $SF_j = \Sigma_i^{N_j} f(p_{ij} + \Delta p_{ij}, t_{ij} + \Delta t_{ij}, I_{ij}, D_{ij}, x_{ij} + \Delta x_{ij}, y_{ij} + \Delta y_{ij})$, where $SF_j$ is the j-th subframe, which includes a set of $N_j$ subpixels, each i-th subpixel of the $N_j$ subpixels to be illuminated for $SF_j$; where $f$ is a function that represents the controller and its functions, such as, e.g., the illumination of the i-th subpixel using a plurality of parameters, the parameters for the j-th subframe including: $t_{ij}$=time when the i-th subpixel is illuminated; $D_{ij}$=duration of the i-th subpixel illumination; $(x_{ij}, y_{ij})$=location of the i-th subpixel within the array; $I_{ij}$=intensity of the i-th subpixel illumination; $p_{ij}$=position of the LLSO for the i-th subpixel; and a set of incremental deviations of the plurality of parameters, the incremental deviations including: $\Delta t_{ij}$=time deviation from which the i-th subpixel is illuminated; $\Delta x_{ij}$, $\Delta y_{ij}$=position deviations from the i-th subpixel; and $\Delta p_{ij}$=LLSO or light deviator position deviations for the i-th subpixel. The plurality of parameters to the function $f$ may be represented as components of a vector, $q_{ij}$. In some embodiments, some subframes may have incremental deviations that are all zero, and other subframes may have ranges or sets of incremental deviations to produce a desired visual effect as perceived by a viewer.

In some examples, a set of parameters may be used in the generation of one or more subframes in which each incremental deviation is zero. In other examples, a set of parameters may be used for a subframe in which a set of incremental deviations has non-zero elements and the temporally multiplexed image may be designed to be perceived to a viewer to be blurred or out-of-focus. In other examples, each subframe of the one or more subframes may each be generated using a unique set of parameters with sets of incremental deviations and may be used to encode various depth cues into subframes.

According to some embodiments, a system for generating a temporally multiplexed image may include (1) an array system including a plurality of subpixels in the form of an array, (2) an optical system that (i) receives light from illuminated subpixels of the array system, (ii) shifts laterally the received light by a rotating light deviator such that direction in which the received light is shifted correspond to rotational positions of the light deviator, and (iii) directs the laterally shifted light towards a viewing region, and (4) a controller. The controller may receive input data for generating an image and convert the input data into a sequence of instructions to direct the array system and the optical system to (i) generate a first set of subframes while the light deviator is respectively oriented in a first set of specified rotational positions by illuminating a first group of subpixels of the array system during the first set of subframes to generate an unaltered portion of the image at the viewing region, and (ii) generate a second set of subframes while the light deviator is respectively oriented in a second set of specified rotational positions by illuminating a second group of subpixels of the array system during the second set of subframes to generate an altered portion of the image at the viewing region.

In at least one example, the altered portion of the image may include one or more objects that are designed to be perceived to be at least one of blurred or out-of-focus when viewed by a viewer. The unaltered portion of the image may include one or more objects that are designed to be perceived to be sharp when viewed by a viewer. In some example, light received by the optical system from each of the first group of subpixels of the array system during the first set of subframes may be laterally shifted by the light deviator to a first group of subpixel positions designated for reproducing corresponding portions of the image without visual alteration when viewed by a viewer. Additionally or alternatively, light received by the optical system from each of the second group of subpixels of the array system during the second set of subframes may be laterally shifted by the light deviator away from a second group of subpixel positions designated by the controller for reproducing corresponding portions of the image without visual alteration when viewed by the viewer. The light laterally shifted to each of the first group of subpixel positions by the light deviator may include light received by the optical system from a plurality of subpixels of the first group of subpixels of the array system.

In some embodiments, a method for temporally multiplexing an image may include (1) receiving input data by a controller, (2) converting the input data into a sequence of instructions by the controller to control a plurality of functions of an array system and of an optical system, the array system including a plurality of subpixels in the form of an array, (3) generating one or more subframes from the sequence of instructions, the sequence of instructions for each subframe including, for each subframe, a subset of the plurality of subpixels, where each subpixel of the subset is illuminated at a predetermined time and at a predetermined position of a light deviator of the optical system, the light deviator possessing at least one lateral-light-shifting degree of freedom, and (4) temporally multiplexing the subframes using the optical system, the one or more subframes designed to display an image to a viewer at a viewing region.

In some examples, light from one or more subpixels of a first set of subpixels may be laterally directed to positions of each subpixel of a second set of subpixels. The one or more subpixels from the first set of may produce light that augments, contributes, or replaces light that might be emitted from each subpixel of the second set.

Features from any of the embodiments of the present disclosure may be used in combination with one another in accordance with the general principles described herein. These and other embodiments, features, and advantages may be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5A is a front view of an example rotating prism disposed over light-emitting regions and causing a fixed location to display or to project multiple sub-pixel types in accordance with some embodiments.

FIG. 5B is a continuation of the example of FIG. 5A in accordance with some embodiments.

FIG. 5C is a continuation of the example of FIG. 5A, in accordance with some embodiments.

FIG. 5D is a continuation of the example of FIG. 5A in accordance with some embodiments.

FIG. 10A is an example computational representation of how depth of perception may be generated, in accordance with some embodiments.

FIG. 10B is a continuation of the example of FIG. 10A, in accordance with some embodiments.

FIG. 10C is a continuation of the example of FIG. 10A, in accordance with some embodiments.

FIG. 10D is a continuation of the example of FIG. 10A, in accordance with some embodiments.

FIG. 10E is a continuation of the example of FIG. 10A, in accordance with some embodiments.

FIG. 10F is a continuation of the example of FIG. 10A, in accordance with some embodiments.

Figure 1:
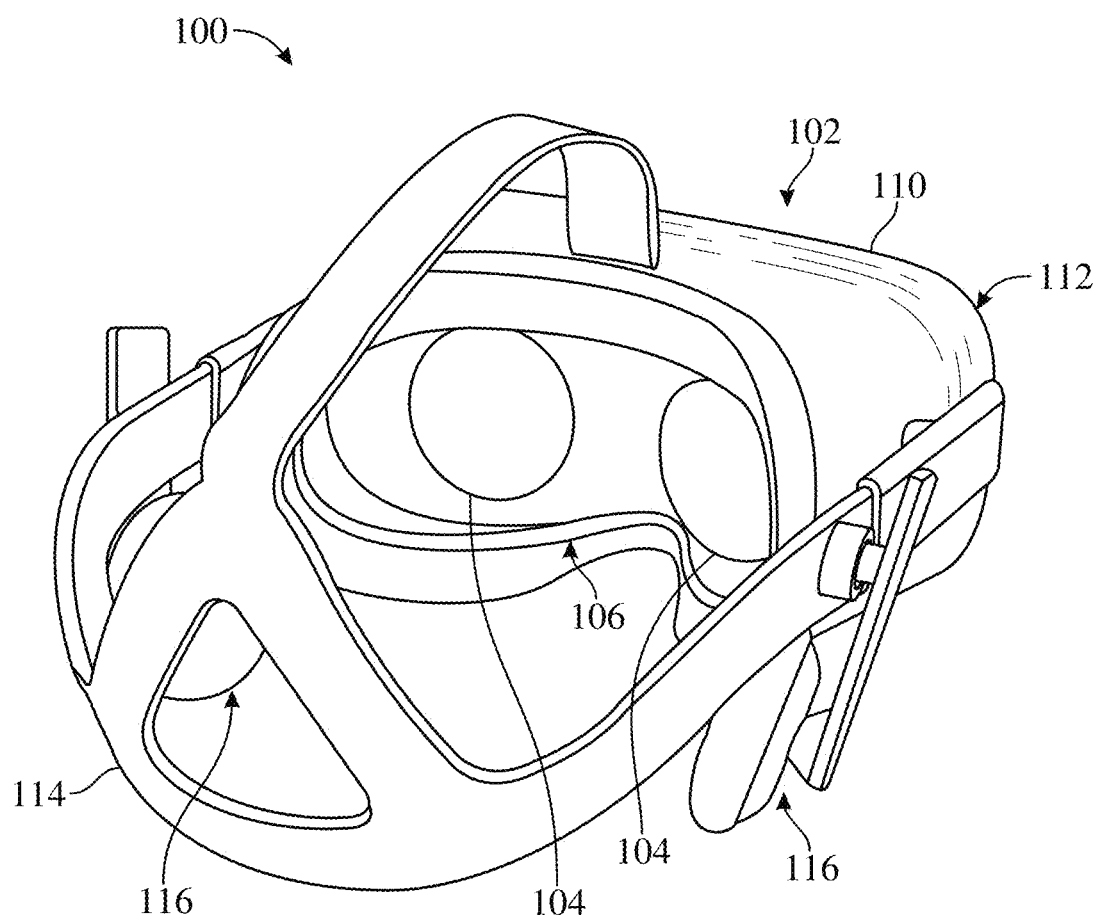
FIG. 1 is a perspective schematic of an example head-mounted (HMD), in accordance with one or more embodiments disclosed herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and may be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatus, systems, and methods for generating an image by temporally multiplexing a plurality of subframes, in which each subframe contains a portion of the image to be viewed. As will be explained in greater detail below, embodiments of the instant disclosure may include one or more arrays of subpixels utilized in a combination with a computing device. The subpixel arrays may be used in, for example, an external monitor, a built-in monitor, a game array, a head mounted array (HMD), or other array using colored subpixels and where individual pixels and/or subpixels may be separately operable to emit light. The array of subpixels may include a subpixel layout that may include at least a plurality of subpixel types of three or more different colors arranged in selected linear paths, circular or substantially circular paths, and/or any other suitable paths (e.g., rectangular paths, square paths, hexagonal paths, etc.). In some embodiments, a subpixel array may include a light-emitting layer and a color selector layer (e.g., a color filter layer, a color converting emissive layer, etc.) that may be moved parallel relative to the light-emitting layer by an actuator.

The described arrays and subpixel arrangements may allow for spatial and/or temporal pixel or subpixel averaging. Each pixel may include subpixels that may be operable to emit a white light when illuminated concurrently. Each color of a subpixel may lie on a circular path such that a circular translation may allow each color subpixel to appear in the same location. In some examples, a pixel or subpixel at one physical location on the array may seem to a viewer to originate from a different array location, while the array remains stationary.

Embodiments of the present disclosure may include or be implemented in conjunction with an artificial reality system. Artificial reality is a form of perceived reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that may be used to, e.g., create content in artificial reality and/or may otherwise be used (e.g., perform activities) in artificial reality.

An artificial reality system that provides the artificial reality content may be implemented on various platforms, including a head-mounted array (HMD) connected to a host computer system, a standalone HMD such as the one depicted in FIG. 1, a mobile device, or computing system, or any other hardware platform capable of providing artificial reality content to one or more viewers. Emerging applications may require higher resolution of subpixel arrays, faster frame-rates, smaller total size, lighter weight, lower-power, higher color gamut, etc.

Embodiments of the present disclosure relate to apparatus and methods for manipulating the direction of light emitted from subpixels in a subpixel array to apparent locations of other subpixels in that array by laterally shifting the emitted light. Such lateral shifting may aid in increasing the brightness of the apparent subpixel. Additionally, or alternatively, the color of an apparent subpixel may be altered by combining laterally shifted light from other subpixels operable to emit light of varying colors and/or intensities. Such lateral shifting of light may also permit, in some embodiments, the ability to create an image that possesses an illusion of a depth of focus. This may allow for the creation of more realistic images containing objects with varying degrees of sharpness (i.e., in or out of focus) and thus control of the perception of depth.

The apparatus and methods presented herein may facilitate shifting a relative position of a subpixel array to an optical assembly coupled to the array of subpixels during scanning of the subpixel array to obtain an image presented to an eye box (i.e., a viewing region) having a resolution greater than an original resolution of the array.

Figure 2:
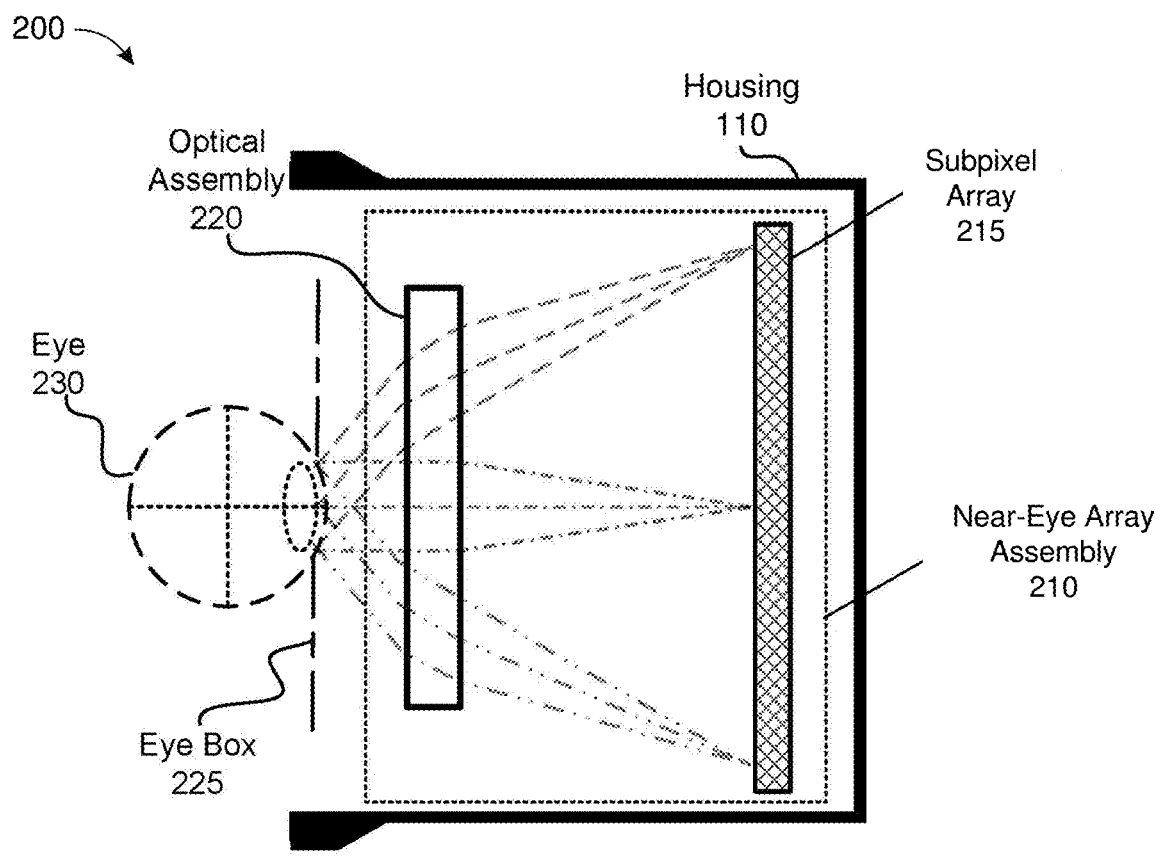
FIG. 2 is a cross-sectional schematic of a portion of an example front section of an HMD in accordance with some embodiments.
Figure 3:
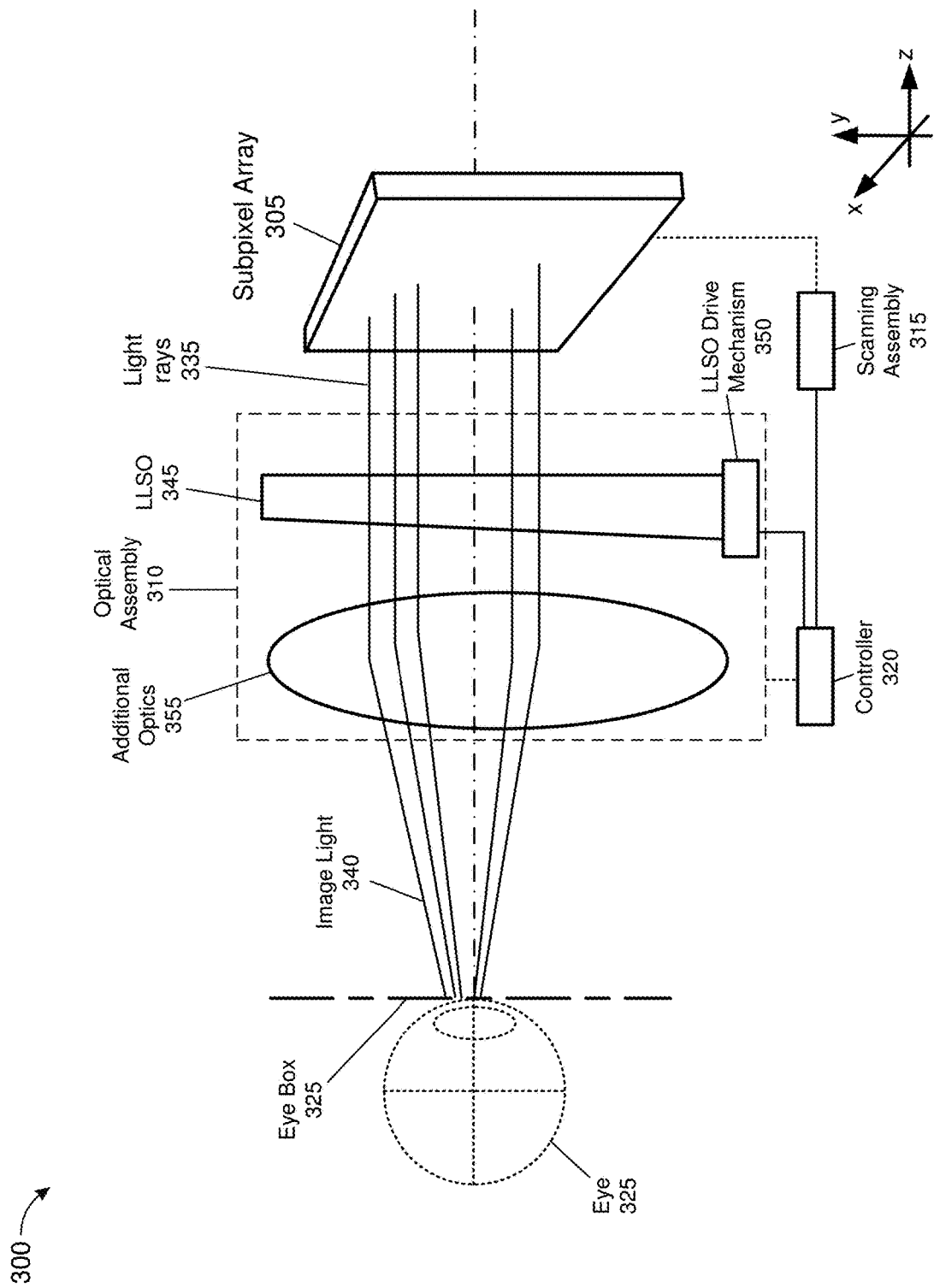
FIG. 3 is a diagram that depicts a portion of an example near-eye array assembly with a subpixel array, an optical assembly, a scanning assembly, and a controller, each of which may be a component in the HMD of FIG. 1, in accordance with some embodiments.

The following will provide, with reference to FIGS. 1-12, detailed descriptions of exemplary embodiments in which the generation of and temporal multiplexing of representations, in the form of subframes, of input data, such as one or more images, may be advantageous. In FIGS. 1-3, examples of head mounted display systems are presented with basic components such as optics and arrays of emissive subpixels. Descriptions of embodiments involving laterally shifting of subpixel light are provided in association with FIGS. 4-9. Discussions associated with FIGS. 6-9 may provide examples of how light is shifted or translocated during operation of a lateral-light-shifting optic (LLSO or light deviator). FIG. 10 provides computer generated images as examples of how the effect of shifting light from one subpixel to another location in the array may be used to generate images, or portions thereof, or objects with any level of blurring. Discussions corresponding to FIGS. 11-12 will provide examples of exemplary methods and exemplary systems.

FIG. 1 is a perspective view of an HMD 100, in accordance with one or more embodiments disclosed herein. The HMD 100 may be part of an artificial reality system. In embodiments that describe an AR system and/or an MR system, portions of an HMD device 102 of the HMD 100 may be at least partially transparent in the visible band (380 nm to 750 nm), and portions of the HMD 100 that may be between the HMD device 102 of the HMD 100 and an eye of the user may be at least partially transparent (e.g., a partially transparent array).

In some embodiments, HMD 100 may include a HMD device 102, a strap subsystem 114, and audio subsystems 116. HMD device 102 may include any type or form of array device or system that is worn on or about a user's head and projects visual content to the user. HMD device 102 may project content in any suitable manner, including via a screen (e.g., a liquid crystal array (LCD) or a light-emitting diode (LED) screen), a projector, a cathode ray tube, an optical mixer, etc. HMD device 102 may project content in one or more of various media formats. For example, HMD device 102 may project videos, photos, and/or computer-generated imagery (CGI). HMD device 102 may include a housing 110 surrounding components of HMD device 102, including lenses 104 and various structural, mechanical, and electronic components, including array components as described herein. Housing 110 may define an opening surrounding a viewing region 106 designed to surround a portion of a user's face and field-of-view. Additionally, housing 110 may include a front-facing portion 112 disposed away from viewing region 106 and side surfaces extending from front-facing portion 112 and surrounding the internal components of head-mounted-array device 102.

FIG. 2 is a cross-sectional view 200 of the HMD device 102 of the HMD 100 shown in FIG. 1, in accordance with one or more embodiments. As shown in FIG. 2, the HMD device 102 may include a housing 110 that houses a near-eye array assembly 210 that may include a subpixel array 215 and an optical assembly 220. The near-eye array assembly 210 may be so constructed herein to increase resolution and/or brightness of light output by the near-eye array assembly 210, e.g., by rapidly moving the subpixel array 215 and/or one or more components of the optical assembly 220. In some embodiments, the near-eye array assembly 210 may include a two-dimensional subpixel array 215 that operably emits light being collimated by a lens system of the optical assembly 220 (not shown in FIG. 2). However, other architectures of the near-eye array assembly 210 may be possible. The subpixel array 215 and the optical assembly 220 together provide light to an eye box 225. The eye box 225 is a region in space that is occupied by a user's eye 230. For purposes of illustration, FIG. 2 shows a cross section 200 associated with a single eye 230, but another optical assembly 220, separate from the optical assembly 220, provides altered light to the other eye of the user. The subpixel array 215 may emit light toward the optical assembly 220. In various embodiments, the subpixel array 215 may include a single array or multiple arrays (e.g., a subpixel array or multiple arrays for each eye of a user). Examples of the subpixel array 215 may include: a liquid crystal array (LCD), an organic light emitting diode (OLED) array, an inorganic light emitting diode (ILED) array, an active-matrix organic light-emitting diode (AMOLED) array, a transparent organic light emitting diode (TOLED) array, an array of quantum dots or of quantum rods, some other array, a projector, or some combination thereof. In some examples, subpixel array 215 may include or may be utilized with a backlit system in which the light to each subpixel may be provided by one or more lasers and a laser-light-to-subpixel distribution system such as one or more MEMS arrays.

In some embodiments, the near-eye array assembly may be incorporated into a HMD, such as HMD 100 of FIG. 1. The HMD may project content to a user wearing the HMD. The HMD may be part of an artificial reality system. The array of the near-eye array assembly may be designed to emit light. The optical assembly of the array assembly may be further designed to direct the light to an eye box of the HMD corresponding to a location of a user's eye.

A near-eye array assembly presented in this disclosure, such as the example presented in FIG. 2, and may include a subpixel array 215, an optical assembly 220, the latter of which may include a scanning assembly. The subpixel array 215 may be designed with a subpixel array operable to emit light. The optical assembly 220 may be designed to provide optical correction to the light, in the form of a lateral shift in the direction of the light, and then direct the light toward an eye box 225 of a user's eye 230. An eye box 225 may be defined as a region where an entrance pupil of a human eye may be located to perceive an acceptable quality image produced by the downstream viewing optics. The subpixel array 215 and/or optical assembly 220 may be moved rapidly, e.g., by the scanning assembly, to increase resolution and/or brightness of the light output by the near-eye array assembly.

A subpixel array 215 may be densely-populated, meaning that there is little space between subpixels. One or more components of the optical assembly 220 optically coupled to the array, may be moved in a manner such that light from a given subpixel overlays light from another subpixel, thereby making each subpixel location to function as a subpixel of the same size enhancing a perceived array resolution at the eye box. Stated equivalently, the light from a subpixel may be optically manipulated to appear to a viewer as if the light originated at a different location in the array.

In some embodiments, the near-eye array assembly may be incorporated into a HMD. The HMD may project content to a user wearing the HMD. The HMD may be part of an artificial reality system. The array of the near-eye array assembly may be designed to emit light. The optical assembly of the array assembly may be further designed to direct the light to an eye box of the HMD corresponding to a location of a user's eye.

The subpixel array 215 may also include an aperture, a Fresnel lens, a convex lens, a concave lens, a diffractive element, a waveguide, a filter, at least one polarizer, a diffuser, a fiber taper, a reflective surface, a polarizing reflective surface, or any other suitable optical element that affects the light emitted from the subpixel array 215. In some embodiments, the subpixel array 215 may have one or more coatings, such as anti-reflective coatings. More details about architecture of the subpixel array 215 and operation of the subpixel array 215 within the near-eye array assembly 210 are provided in conjunction with FIG. 3.

The optical assembly 220 may receive light emitted from the subpixel array 215 and direct the light to the eye box 225 of the user's eye 230. The optical assembly 220 may also magnify the received light, correct optical aberrations associated with the light, and the corrected light may be presented to a user of the HMD 100. In some embodiments, the optical assembly 220 may include a collimation element (e.g., a lens) for collimating beams of light emitted from the subpixel array 215. At least one optical element of the optical assembly 220 may be an aperture, a Fresnel lens, a refractive lens, a reflective surface, a diffractive element, a waveguide, a filter, or any other suitable optical element that affects light emitted from the subpixel array 215. Optical assembly 220 may also possess one or more refractive elements in the form of a tilted glass plate or lens, an LLSO, and/or a birefringent optic. Alternatively, or additionally an LLSO may be pivoted, and/or tilted, and or provide light reflections, thus adding additional light-shifting degrees of freedom. The LLSO also may be a device, such as a liquid crystal switchable blazed grating stack, which redirects light, using reflections, in different directions.

Moreover, the optical assembly 220 may include combinations of different optical elements. In some embodiments, one or more of the optical elements in the optical assembly 230 may have one or more coatings, such as anti-reflective coatings, dichroic coatings, polarizing coatings, etc. Magnification of the image by the optical assembly 220 allows elements of the subpixel array 215 to be physically smaller, weigh less, and consume less power than larger arrays. Additionally, magnification may increase a field-of-view (FOV) of the projected media. For example, the FOV of the projected media is such that the projected media may be presented using almost all (e.g., 110° diagonal), and in some cases, all of the user's FOV. In some embodiments, the optical assembly 220 may be designed so its effective focal length is larger than the spacing to the subpixel array 215, which magnifies an image projected by the subpixel array 215. Additionally, in some embodiments, the amount of magnification may be adjusted by adding or removing optical elements. More details about the optical assembly 220 and operation of the optical assembly 220 within the near-eye array assembly 210 are described in conjunction with FIG. 3.

In some embodiments, the housing 110 may further include an eye tracking system (not shown in FIG. 2) that determines pupil tracking information for the user's eye 230. The determined eye tracking information may include information about a position (including orientation) of the user's eye 230 in the eye box 225, i.e., information about an angle of an eye gaze. In one embodiment, the eye tracking system may illuminate the user's eye 230 with structured and unseen light. The eye tracking system may use locations of the reflected structured light in a captured image to determine the position of the user's eye 230. In another embodiment, the eye tracking system determines the position of the user's eye 230 based on magnitudes of light captured over a plurality of time instants.

In some embodiments, the housing 110 may further include a varifocal module (not shown in FIG. 2). The varifocal module may adjust focus of one or more images displayed on the subpixel array 215, based on the eye tracking information obtained from the eye tracking system. In one embodiment, the varifocal module may adjust focus of the displayed images and mitigates vergence-accommodation conflict by adjusting a focal distance of the optical assembly 220 based on the determined eye tracking information. In other embodiments, the varifocal module may adjust focus of the displayed images by performing foveated rendering of the one or more images based on the determined eye tracking information.

FIG. 3 illustrates additional detail of an example near-eye array assembly 300, in accordance with one or more embodiments. The near-eye array assembly 300 may be designed herein to increase resolution and/or brightness of light output by the near-eye array assembly 300. The near-eye array assembly 300 may include a subpixel array 305, an optical assembly 310, a scanning assembly 315 coupled to at least one or both of the subpixel array 305 and the optical assembly 310, and a controller 320 coupled to the scanning assembly 315. The near-eye array assembly 300 may be part of the HMD 100 in FIG. 1. Furthermore, the near-eye array assembly 300 may be part of a HMD implemented as an eyeglass-type platform. In this case, the subpixel array 305 of the near-eye array assembly 300 may be also implemented as a waveguide-based array.

The near-eye array assembly 300 may be an embodiment of the near-eye array assembly 210 in FIG. 2; the subpixel array 305 may be an embodiment of the subpixel array 215 in FIG. 2; and the optical assembly 310 may be an embodiment of the optical assembly 220 in FIG. 2. The subpixel array 305 emits or is operable to emit light, e.g., based in part on controller instructions from the controller 320. In one embodiment, the subpixel array 305 may be implemented as an OLED array. In another embodiment, the subpixel array 305 may include quantum dots or rods. In other embodiments, the subpixel array 305 may be implemented as an LED array. In still other embodiments, one or more lasers may illuminate subpixels from behind and colored light may be produced by a linear combination of light from a plurality of lasers, or a single laser may excite specific phosphor coatings present in each subpixel. Additionally, or alternatively, subpixel array 305 may be implemented as any suitable type of emissive display array, without limitation.

In some embodiments, a resolution of the subpixel array 305 may be below a threshold resolution, i.e., a number of pixels in each dimension may be below a threshold number per unit distance. In other embodiments, a resolution of the subpixel array 305 may be above the threshold resolution, i.e., the number of pixels in each dimension may be above the threshold number per unit distance. The subpixel array 305 may be referred to as a sparsely populated array when a distance between adjacent subpixels is at least a size of an emission area of a subpixel (and in some arrangements, is multiple times larger than the size of the emission area of the subpixel). The subpixel array 305 may be referred to as a densely populated array when a distance between adjacent subpixels is less than an emission area of a subpixel. In one or more embodiments, each subpixel position in the subpixel array 305 may be occupied by one emission element or subpixel. The subpixel array 305 may be then referred to as a fully-populated array, which may be considered to be a special case of a densely-populated array. In general, the subpixel array 305 may be implemented herein to have a first resolution of pixels. More details about a pixel/subpixel arrangement within the subpixel array 305 are provided in conjunction with FIG. 5.

The optical assembly 310 controls a FOV at an eye box 325 of an eye 330 and directs a plurality of light rays 335 emerging from the subpixel array 305 toward the eye box 325. In general, the subpixel array 305 may be implemented herein to have a first resolution of pixels. In accordance with at least one embodiment, the scanning assembly 315 may be designed to shift directions of the light rays 335 in accordance with controller instructions (e.g., provided by the controller 320) such that a virtual array is projected to the eye box 325, wherein the virtual array (not shown in FIG. 3) has a second resolution greater than the first resolution of the subpixel array 305. Thus, a resolution of light 340 presented to the eye box 325 may be greater than that of the light rays 335. In addition, a level of brightness (intensity) of the light 340 at the eye box 325 may be increased relative to a level of brightness of the light rays 335 when being emitted from the subpixel array 305. In an exemplary embodiment, the scanning assembly 315 may be designed to shift a direction of at least one of the light rays 335 in accordance with the controller instructions, wherein the second resolution of the virtual array presented to the eye box 325 may be increased by at least one virtual pixel relative to the first resolution of the subpixel array 305.

In some embodiments, the optical assembly 310 may include additional optics 355, which may include one or more electro-optical elements. In one or more embodiments, the one or more electro-optical elements of the additional optics 355 may include one or more electro-optical liquid deformable surfaces. Operation of the one or more electro-optical elements in the additional optics 355 may be controlled based in part on, for example, the controller instructions from the controller 320 to shift the directions of the light rays 335 emitted from the subpixel array 305 to increase resolution and/or brightness of the projected light 340 at the eye box 325.

Figure 4:
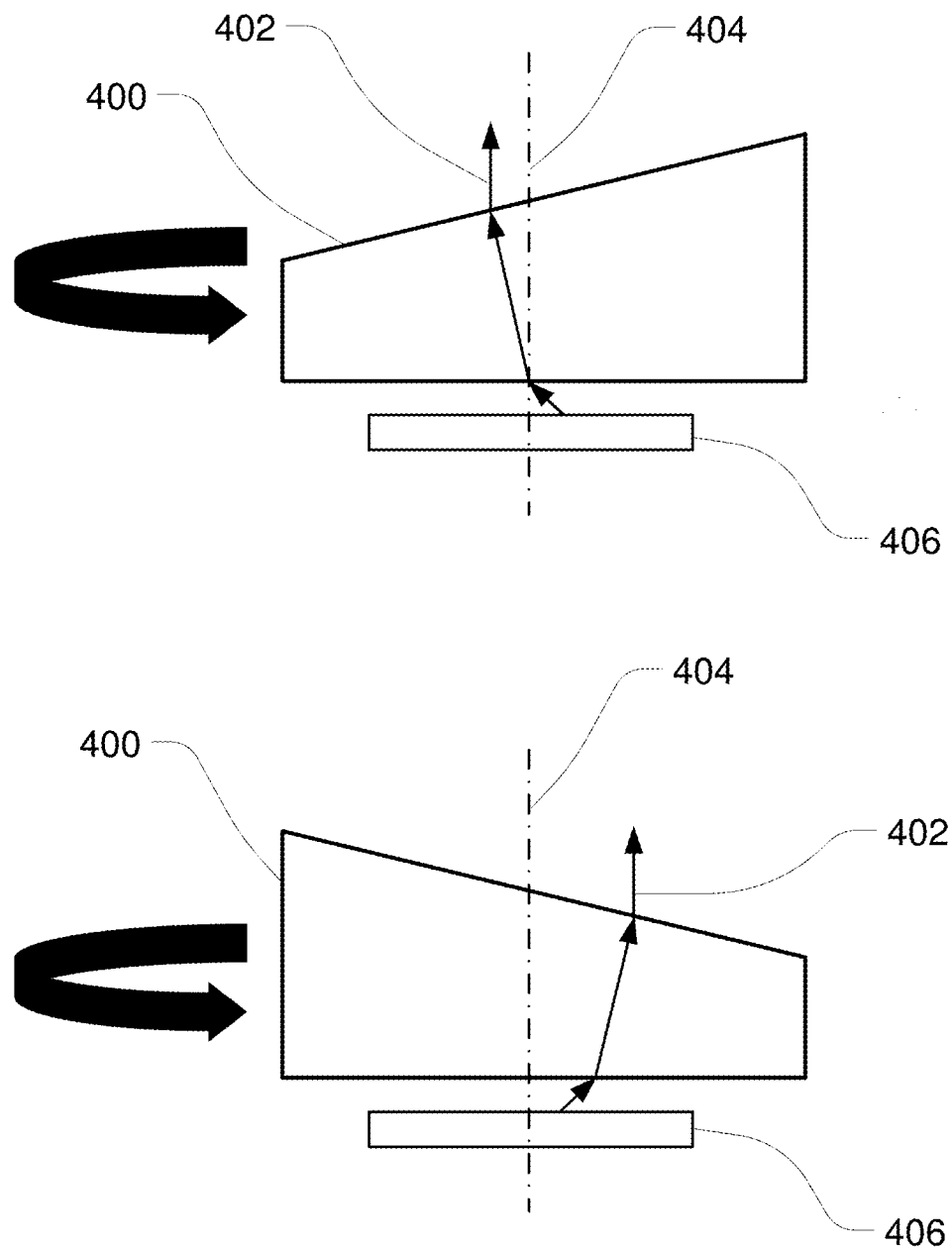
FIG. 4 is a cross-sectional side view of an example lateral-light-shifting optic (LLSO, light deviator) for altering a light path disposed over a light-emitting region in accordance with some embodiments.

In some embodiments, the optical assembly 310 may include at least one LLSO 345 (see, e.g., the LLSO shown in FIG. 4). In one or more embodiments, as will be described in greater detail below, the LLSO 345 in the optical assembly 310 may be so configured as to rotate about an axis perpendicular to or tilted relative to the plane of the subpixel array 305. The rotation characteristics of the LLSO 345 (speed, location, etc.) and/or the tilt and/or pivot of the LLSO 345 may be controlled based in part on, for example, the controller instructions from the controller 320.

By rotating or manipulating the LLSO 345 in the optical assembly 310 about an optical axis of the optical assembly 310 (e.g., based in part on the controller instructions from the controller 320), the directions of the light rays 335 emitted from the subpixel array 305 may be laterally translated with respect to an undeviated ray, thereby increasing resolution, brightness, and/or color of the projected light 340 at the eye box 325. In some embodiments, the LLSO 345 may include two separate rotating LLSOs (light deviators), either co-rotating or rotating separately. Each LLSO or light deviator may be separately controlled by the controller 320 or subsystems of the controller 320. In other embodiments, the LLSO 345 may have the function to tilt and/or to pivot. A drive mechanism 350 may perform the variety of motional conveyances to the LLSO 345, such as rotation, tilt, and/or pivot. The controller 320 may provide to the drive mechanism 350 instructions to the LLSO 345 in order that the LLSO 345 is in a specific position when light from a given subpixel of the subpixel array 305 is instructed by the controller 320 to be emitted.

In some embodiments, the scanning assembly 315 may be designed to shift the directions of the light rays 335 emitted from the subpixel array 305 by rotationally and/or laterally shifting a relative position of the subpixel array 305 to the optical assembly 310 in accordance with the controller instructions (e.g., from the controller 320) at each time interval of a plurality of time intervals in a time period of scanning the subpixel array 305. The scanning assembly 315 may include at least one positioner coupled to the subpixel array 305 for rapidly moving the subpixel array 305 and/or at least one component (e.g., additional optics 355) of the optical assembly 310 along a lateral dimension during the scanning, thereby shifting the relative position of the subpixel array 305 to the optical assembly 310 and increasing resolution and/or brightness of light at the eye box 325. Additional optics 355, part of the optical assembly 310, may include optical components that direct the laterally shifted light emerging from the LLSO 345 towards the eye box 325. These additional optics 355 may be transmissive or reflective, or a combination of both.

In some embodiments, at least one positioner of the scanning assembly 315 may be implemented as a micro-actuator designed to move the subpixel array 305 and/or the at least one component of the optical assembly 310, based in part on, e.g., the controller instructions from the controller 320, thereby increasing resolution and/or brightness of the projected light 340 at the eye box 325. Such a micro-actuator might be a piezoelectric or magneto-strictive device.

Furthermore, in one embodiment, the at least one positioner of the scanning assembly 315 may be designed to rotate, to tilt, or to pivot, or to reflect or any combination of these movements, the at least one LLSO 345 of the optical assembly 310 about an axis of the optical assembly 310 (e.g., based in part on the controller instructions from the controller 320) to shift the directions of the light rays 335 emitted from the subpixel array 305, thereby increasing resolution and/or brightness of the projected light 340 at the eye box 325.

In some other embodiments, the at least one positioner of the scanning assembly 315 may be designed to shift the subpixel array 305 and/or the at least one component of the optical assembly 310 and to rotate at least one other component of the optical assembly 310 during a time period (or control in some other manner operation of the other component of the optical assembly 310), thereby shifting directions of the light rays 335 emitted from the subpixel array 305 and increasing resolution and/or brightness of the projected light 340 at the eye box 325. The controller 320 may generate controller instructions for one or more components of the near-eye array assembly 300. The subpixel array 305 may emit the plurality of light rays in accordance with the controller instructions from the controller 320. In some embodiments, the controller 320 may be coupled, via the scanning assembly 315, to at least one of the subpixel array 305 and the optical assembly 310. Thus, the scanning assembly 315 may operate as an electrical or electro-mechanical interface between the controller 320 and at least one of the subpixel array 305 and the optical assembly 310.

In other embodiments, when the subpixel array 305 may be implemented as a densely-populated array, the controller 320 may instruct, based in part on the controller instructions, the scanning assembly 315 to translate the subpixel array 305 and/or the optical assembly 310 linearly along orthogonal paths (i.e., lateral dimensions) using at least one positioner of the scanning assembly 315 to effectively shift the subpixel array 305 and/or the optical assembly 310 around in a circular path during a time period of translational movement. In this manner, the densely-populated subpixel array 305 may be presented at the at the eye box 325 as the virtual array having an increased subpixel/pixel resolution.

Furthermore, in an embodiment, the controller 320 may be designed to instruct the at least one positioner of the scanning assembly 315 to manipulate movements of the LLSO within the optical assembly 310 about an axis of the optical assembly 310 to shift the directions of the light rays 335, based in part on the controller instructions, thereby increasing resolution and/or brightness of the projected light 340 at the eye box 325. In another embodiment, the controller 320 may instruct the at least one positioner of the scanning assembly 315 to manipulate a collimation element of the optical assembly 310 about an axis of the optical assembly 310 to shift the directions of the light rays 335, based in part on the controller instructions, thereby increasing resolution and/or brightness of the projected light 340 at the eye box 325.

In one or more embodiments, the controller 320 may directly interface with one or more components of the optical assembly 310 (e.g., one or more electro-optical liquid deformable surfaces). The controller 320 may be then designed to control operation of the one or more electro-optical elements in the optical assembly 310 based in part on the controller instructions to shift the directions of the light rays 335 emitted from the subpixel array 305, thereby increasing resolution and/or brightness of the projected light 340 at the eye box 325. For example, the controller 320 may control, based in part on the controller instructions, a level of voltage applied to each electro-optical liquid deformable surface in the optical assembly 310 to change a refractive index of that surface and shift the directions of the light rays 335 emitted from the subpixel array 305. In other embodiments, the controller 320 may be designed to control, based in part of the controller instructions, operation of the scanning assembly 315 (e.g., of the at least one positioner in the scanning assembly 315) to control a brightness of a virtual pixel of the virtual array at the eye box 325 based on a number of times over a time period a location at the eye box 325 corresponding to the virtual pixel receives one or more light rays of the plurality of light rays 335 associated with a particular subpixel color emitted from the subpixel array 305.

Furthermore, in some embodiments, when the subpixel array 305 is implemented as a sparsely populated array, the controller 320 may instruct the at least one positioner of the scanning assembly 315 during a time period to control operation of at least one component (e.g., LLSO 345 and/or additional optics 355, such as a collimation element or electro-optical element) of the optical assembly 310 as well as to move rapidly the subpixel array 305 and/or at least one other component of the optical assembly 310 along a lateral dimension, based in part on the controller instructions. In this manner, the sparsely-populated subpixel array 305 may be presented at the at the eye box 325 as the virtual array having an increased subpixel/pixel resolution. An example of a sparsely-populated array would be a smart pixel array.

In other embodiments, when the subpixel array 305 may be implemented as a densely-populated array, the controller 320 may instruct the at least one positioner of the scanning assembly 315 during the time period to control operation of at least one component (e.g., LLSO, collimation element, or electro-optical element) of the optical assembly 310 as well as to translate rapidly the subpixel array 305 and/or at least one other component the optical assembly 310 linearly along orthogonal paths to shift effectively the subpixel array 305 and/or the optical assembly 310 around in a circular path, based in part on the controller instructions. In this manner, the densely-populated subpixel array 305 may be presented at the at the eye box 325 as the virtual array having an increased subpixel/pixel resolution.

In some embodiments, for the multi-chromatic sparsely-populated subpixel array 305, the scanning may be sufficiently fast such that the eye 330 integrates light from three different neighboring subpixels of different color channels that occupy the same subpixel position (e.g., upper-left corner 504 of FIGS. 5A-D) in a cell at different time instants. The three different subpixels occupying the same subpixel position in the cell at different time instants may form a virtual RGB subpixel of the same size as a single-color-channel subpixel. In this manner, a virtual RGB subpixel representing a white pixel may be provided at a subpixel position of the sparsely-populated subpixel array 305. In some embodiments, for the sparsely-populated subpixel array 305, the eye may 330 integrate light from three different neighboring subpixels that occupy a subpixel position (e.g., upper-left corner) in a pixel at different time instants such that a brightness of light emitted from the subpixel position is increased.

Subpixel array 215 in FIG. 2 and/or subpixel array 305 in FIG. 3 may include any suitable emissive array technology, which is subpixel addressable. For example, subpixel array 215 may include pixels/subpixels formed of light-emitting diodes (LEDs), organic light-emitting diodes (OLEDs), quantum dots, quantum rods, plasma cells, electrophoretic array elements, liquid crystal array (LCD) components, electrowetting array elements, cathode ray tube (CRT elements), and/or any other suitable image pixel technology. Backlit display or projecting systems may also be viable.

In alternative embodiments, one or more lasers may illuminate subpixels from behind and colored light may be produced by a linear combination of light from a plurality of lasers, or a single laser may excite specific phosphor coatings present in each subpixel. Additionally or alternatively, subpixel array 305 may be implemented as any suitable type of emissive display array, without limitation.

Subpixel arrays 215 and 305 may be designed to create colors having a wavelength between subpixels operably emitting the highest wavelength light and subpixels operably emitting the lowest wavelength light. Thus, combining light from subpixels with differing spectral properties may be used to produce a broad spectrum of colors visible to a viewer. In some examples, spatial subpixel averaging may produce colors visible to a user by using subpixels in close spatial proximity to enable a pixel to appear to emit a single, variable color.

In some embodiments, variable colors may be produced in a subpixel array using temporal subpixel averaging. Temporal subpixel averaging may produce colors visible to a user by emitting multiple colors of light from a single subpixel location at different moments in time in rapid succession. The human eye may perceive the rapidly changing colors as a single color emitted from the subpixel location. For example, if a subpixel location flashes red, green, and blue rapidly (e.g., as in temporal multiplexing), the human eye may perceive the subpixel as a white. In some embodiments, additional subpixels may be added to subpixel array 215 and/or 305 to increase the brightness and/or extend the color gamut of the subpixel array 215 and/or 305.

According to various embodiments, a subpixel layout designed for spatial subpixel averaging may include a dense packing of subpixels to maximize resolution. The subpixel layout may further vary the size and shape of subpixels to minimize the sum of the subpixel areas that make up a single pixel. Layout optimization for temporal subpixel averaging, as described herein, may result in very different subpixel layouts compared to spatial subpixel averaging. When optimizing for temporal subpixel averaging, a subpixel may be the same size, shape, and orientation as every other subpixel. This may allow for effective spatial overlap of subpixels through simple translation of the optical path or color-selecting layer, without the need for rotation or other transformations which require more complex mechanisms. In addition, straight lines may exist along which every subpixel color may be found with minimal unused space or repetition to allow full color overlap via translation along a single axis. For example, the linear path may be contiguous with one of each subpixel. In some examples, contiguous objects or regions may have a common border or may be adjacent or touching one another. For example, a contiguous path of subpixels may include each subpixel with no additional subpixels in the path between the subpixels. Similarly, circular paths, substantially circular paths, and/or other circuitous paths (e.g., rectangular paths, hexagonal paths, etc.) may exist along which every subpixel color may be found with minimal unused space or repetition. For example, a circular path may not have a diameter greater than the sum of the lateral dimensions of the subpixels of every subpixel color. In some examples, the lateral dimensions of a subpixel may refer to the spacing between centers of a subpixel. In some examples, the actual lateral dimensions of a light-emitting element of a subpixel may be less than the spacing between the subpixels.

According to some embodiments, another technique suitable for temporal subpixel averaging may include using the LLSO to alter the light path laterally from subpixels so that colors of multiple subpixel types appear to emit from the same subpixel location without the array device physically moving. FIG. 4 illustrates an example of a rotating prismatic LLSO 400 that may alter a light path 402 from an exemplary light-emitting region of an array 406 by one or more subpixel widths, resulting in a subpixel location that may include light from multiple adjacent subpixel types disposed along a curved (e.g., circular) path centered about and/or surrounding the subpixel location.

In the top example shown in FIG. 4, exemplary light path 402 emits from a location to the left of axis 404, while in the lower example, exemplary light path 402 emits from a location to the right of axis 404. The source of light path 402 has not changed, but the emitted location varies, in this example, in a circular path in conjunction with rotation of prism LLSO 400. If the time it takes to travel one full rotation of the prism LLSO 400 equals the time to transition through the colors of light from a subpixel, a single subpixel location may appear to emit the colors of light during one rotation of the prism LLSO 400. The prism LLSO 400 may be utilized with any suitable subpixel layout, including the exemplary subpixel layouts disclosed herein.

The LLSO may be, in part, prismatic in profile, such as a regular triangular prism. In alternative embodiments, the prism may be one of a polarizing prism, a Wollaston prism, an amici roof prism, a dove prism, or a pair of Risley prisms. In some alternative or additional embodiments, one or both surfaces of the prism may have optical power. In some alternative or additional embodiments, the optical power may be anamorphic. In some embodiments, the LLSO may be a tilted optical window (e.g., a tilted or tiltable glass plate or lens).

An alternative embodiment for the LLSO is an electrically switchable liquid crystal grating. Optical diffraction gratings may be used in technologies such as multiplexing and processing optical signals. The latter including optical interconnections, beam steering, and sensor array interrogation. In addition, they provide protection to sensors from a hostile environment. Liquid crystals (LC), whose refractive indices may be modulated by an externally applied voltage, enable a design of very high efficiency phase gratings. Moreover, for such gratings, optical properties such as birefringence may be dynamically manipulated. Switchable diffraction gratings may be based, for example, on polymer-stabilized dual frequency nematic liquid crystals. An alternative would be polymer-stabilized cholesteric gratings.

An LC switchable blazed grating may have the following composition. The substrate of the device may be a form of acrylate which is on top of a transparent metal (e.g., indium tin oxide ITO) coated glass. A transparent cover glass, also perhaps of ITO, is place on top of the blazed grating, with a separation between these layers of a few microns. A thin layer of nematic or another appropriate LC may be sandwiched in between. The ITO layer deposited underneath the grating and another ITO layer coated on the bottom surface of the cover plate may be used to electrically drive the LS to change the phase information of the illuminating light. The refractivity of the nematic or another appropriate LC for extraordinary light may be altered by a driving voltage. With no electric field present, refractive indices of the substrate and the LC are different, and strong diffraction is produced by the index-phase difference in the off state. Upon application of an electric field the refractive index of the LC is decreased. At a certain driving voltage, index matching occurs between the acrylate and the LC. Thus, the device is either on or off, which provides, respectively undeflected or deflected light. For multiple angles, stacks of these units perhaps with different grating periods may be used. Different driving conditions for each stack, multiple steering angles may be produced.

Two-dimensional switchable liquid crystal blazed gratings (e.g., cholesteric) may be achieved by applying an electric field to a cholesteric at the optimum field conditions (frequency and voltage) and cholesteric pitch to cell thickness ratio. Alternatively, a polymer-based liquid crystal blazed grating having a prismatic polymer microstructure may be used as a light deviator, such as an LLSO. A stack of liquid crystal switchable blazed gratings (LCSBGS) may allow a plurality of deflection angles.

Thus, a light deviator, such as an LLSO, or a plurality of LLSOs, may possess a plurality of degrees of freedom allowed by rotation, tilt, pivot, and those that may be available from a liquid crystal switchable grating stack including voltages and frequencies for each layer of a stack, which includes at least one reflection control. These functions would be under the control of the controller 320.

FIGS. 5A-D illustrate lateral shifting examples of a rotating LLSO (see, e.g., rotating prism LLSO 400 illustrated in FIG. 4) altering a light path causing a single location 502 to emit light from four different subpixel types, 504, 506, 508, and 510. In some examples, each subpixel type may correspond to a different color or spectral distribution of light, as shown by the four distinct patterns of FIGS. 5A-D. Arrow 512 indicates a direction in which the light path is altered and varies dependent on the rotation of rotating LLSO 500. In FIG. 5A, arrow 512 points down and to the right, resulting in single location 502 arraying subpixel type 504, which is located up and to the left of single location 502. In FIG. 5B, arrow 512 points down and to the left, resulting in single location 502 arraying subpixel type 506, which is located up and to the right of single location 502. In FIG. 5C, arrow 512 points up and to the left, resulting in single location 502 arraying subpixel type 510, which is located down and to the right of single location 502. In FIG. 5D, arrow 512 points up and to the right, resulting in single location 502 arraying subpixel type 508, which is located down and to the left of single location 502. Although FIGS. 5A-5D illustrate examples in which light is laterally shifted from subpixels to a pixel location adjacent to the subpixels, in some embodiments, light may be laterally shifted to subpixel locations that are located further from the light-emitting subpixels (e.g., subpixel locations at lateral distances equivalent to multiple subpixel widths from the light-emitting subpixels).

An LLSO providing lateral translation of light emitted from a single subpixel in a subpixel array (e.g., such as the one in FIG. 4) may provide to a viewer an impression of a curve of light and not a single unresolvable point of light. If the LLSO is a regular prism, as depicted in FIG. 4, then the curve may appear to be a circular ring.

Figure 6:
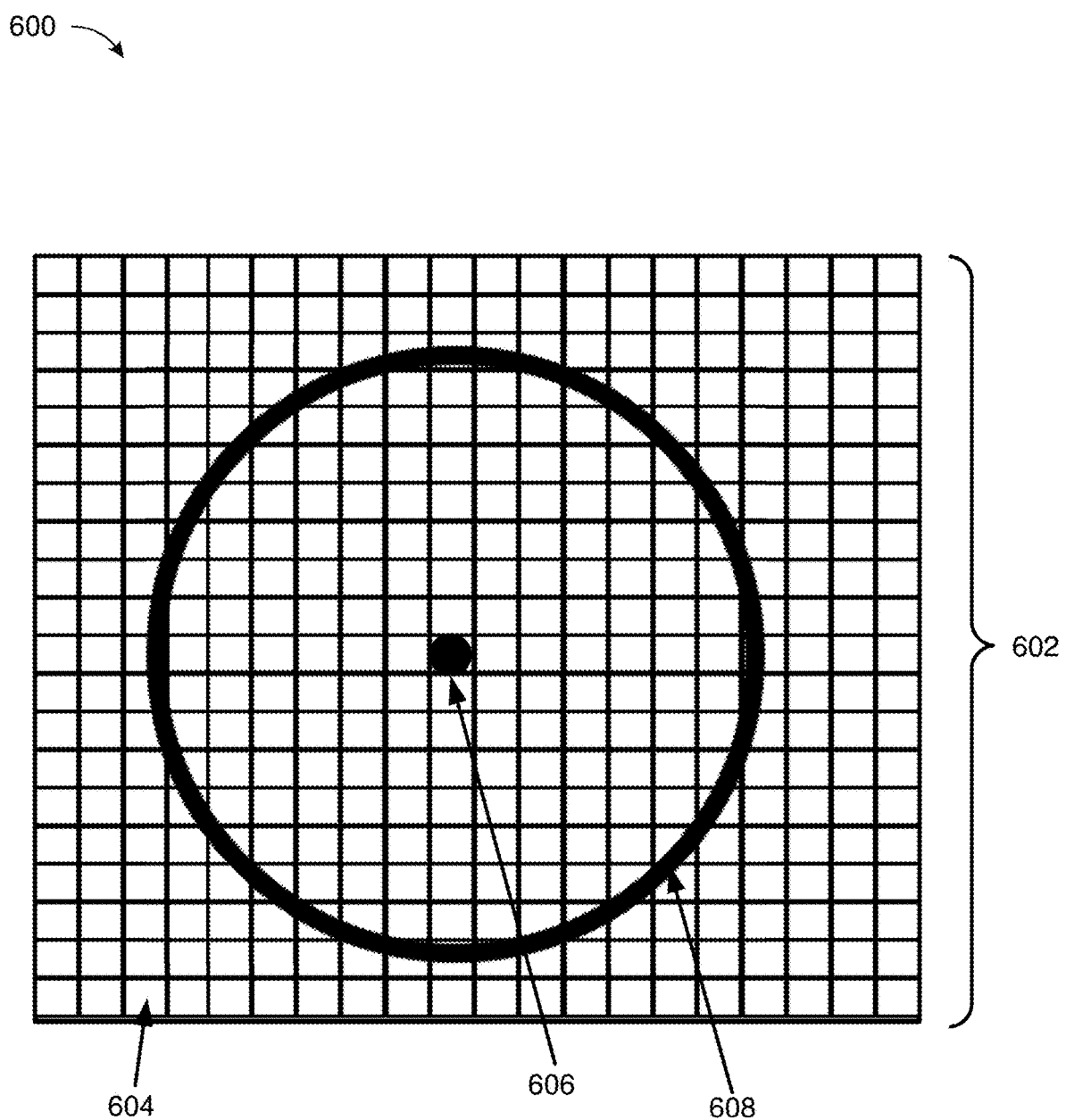
FIG. 6 is a schematic of an example subpixel array that demonstrates the effect of laterally shifting light from one subpixel to another by a rotating prism LLSO (or light deviator), in accordance with some embodiments.

An example is given in FIG. 6, in which a center subpixel is operably illuminated, and during the rotation of the LLSO, the refracted and thus laterally shifted light to the viewer appears as a curve of light. This may be the case if a complete cycle or rotation of the LLSO is less than the integration time of the typical eye, usually <300 ms. The LLSO used in the generation of this curve of light may be that of a rotating regular prism, possessing no optical power.

As has been alluded to previously, the subpixel described hereinabove may be one of any of at least three subpixels, and in some examples four or more subpixels, included in emissive arrays. Each of these subpixels may emit spectral distributions that appears to be one of the colors of red, green, blue, and white. Subpixels may be present in some embodiments that emit additional or alternative colors. In at least one embodiment, each subpixel of a display may emit the same color, where, for example, the display is part of a multi-display system having multiple displays that each emit a different color and the light emitted by the multiple displays is combined to form a single image.

The light emitted from a given subpixel (i.e., a generator subpixel) may be mapped to any of the locations of a unique set of specific subpixels, referred to, for example, as the generator subpixel's set of virtual locations. The uniqueness of that set of virtual locations may depend on the design of the light deviator/LLSO and the space (i.e., allowable) of its movements. The elements of that set may all have the same property such that light from a first generator subpixel may be translocated or shifted to any virtual location within that set. Moreover, the first generator subpixel is not a member of that set of virtual locations. However, every member of that set of virtual locations may be a generator subpixel for the first generator subpixel. Which member of that set of virtual locations becomes the virtually illuminated subpixel may depend on the timing of subpixel illumination with an appropriately determined position of the LLSO.

The generator subpixel thus has the ability to mimic, to replace, or to augment the light being emitted by any subpixel within the set of subpixels that underlie the set of virtual locations associated with a specific generator subpixel. Conversely, any subpixel that underlies any of the virtual locations has a virtual location in the generator subpixel itself. With this type of mapping, the light from the generator subpixel may contribute to the intensity and/or color of the subpixel that underlies the translated light. Advantageously, should the subpixel that underlies a virtual location of a generator subpixel be dead or weak, then the light from that generator subpixel may substitute for or contribute to that which the dead/weak subpixel cannot produce.

The number of virtual locations per subpixel may be the same across the array. However, locations near edges or corners of the array may have fewer generator subpixels that can contribute to them.

With some embodiments of the light deviator or LLSO optical designs, the set of virtual locations may form a ring or a thin annulus. In alternative embodiments of the light deviator optical design, the set of virtual locations may form a non-circular curve. The non-circular curve may take the shape of an ellipse in the case of an anamorphic light deviator. Additionally or alternatively, embodiments may allow for a family of generator subpixels centered on a subpixel, which is not itself a generator subpixel of that family. Such embodiments may be produced by a combination of anamorphic optical design and possible movements of the light deviator or LLSO including rotation, tilt, pivot, and/or reflection(s).

The size and characteristics of the curve as seen by a viewer is dependent primarily on optical properties of the light deviator/LLSO and on the space of allowable movements of the light deviator (LLSO). General optical properties may include the shape of the LLSO design (thickness, prismatic angle, refractivity, optical power, anamorphic, etc.). In the case of a regular prism LLSO, these optical properties may include the distance of the operably illuminated subpixel from the LLSO, the thickness of the LLSO, the apex angle of the LLSO, and the refractivity of the glass or substrate of the LLSO. As the refractivity of the LLSO is often dispersive, it follows that the extent of the distance of the curves from the generator subpixel (diameter, width) produced for each of the different subpixel colors, may vary slightly between disparate colors. However, given that even light from a subpixel seen by a viewer may not be resolvable with typical foveal resolution, the curves from adjacent subpixels each emitting differing colors may be seen to be essentially co-incident. In some embodiments, where the mechanical degrees of freedom of the LLSO may be greater than one, a supra-subpixel width of the curve may be possible.

The viability of VR or AR relies on establishing a proper sense of depth in a viewer and maintaining the relative spatial relationship between objects as the objects move about. As is known, projecting a 3D image onto a 2D plane reduces the visual impression of depth. This is especially the situation for augmented reality see-through arrangements, where the real scene possesses a different depth perspective than that of the artificially generated one. Unless the AR added information to a 3D scene has properly accommodated for depth perception, the visual cortex of the brain may readily separate the actual from the artificial information. While there are many aspects involving depth perception, one of these is focus or sharpness of an object as viewed by a viewer. Another depth cue is one of defocus, un-sharpness, or blurring of an object. Blurred images may contribute to the sense of depth primarily because human eyes have a limited depth of focus. In some scenes, defocus may be the only hint as to depth. Thus, a perception of depth in a generated image may be provided by several depth cues. These may be generated by the arrangement of in-focus and out-of-focus objects in a given scene.

The embodiments shown and described herein may have various possible uses. For example, the described embodiments may be used to encode depth cues into images without the need for subsequent re-rendering. For example, each depth plane of a scene may be split into multiple subframes, meant to be projected, at a set of positions specific to that depth plane. Depth cue computation may be performed before image frames may be sent to a subpixel array. To change what depth plane appears sharp, only one set of values (e.g., "array on" positions) may need to be changed.

In some embodiments, illumination of a set of subpixels, timed with movements of the LLSO, may create the perception of a pattern that is sensed by a viewer. Such a pattern may be that of an object, text, or appropriately modified images. FIG. 6 demonstrates the basic arrangement of subpixels in one part of the subpixel array substituting for or adding to the light from other subpixels in another part of the subpixel array, due to the operation of the light deviator/LLSO extensively described hereinabove.

In FIG. 6, an array 602 of subpixels 604 is optically upstream from a rotating prism LLSO which laterally shifts light emitted from an operably illuminated subpixel from its physical location to an apparent location dictated by the design of the LLSO. In FIG. 6, if a particular subpixel 606 is operably illuminated during a cycle (i.e., a rotation) of the optically downstream LLSO, and within the integration time of the eye of a viewer, then that viewer may perceive at least a portion of a curve of light 608 which has been generated from only that one subpixel 606, and the rotating LLSO.

In some embodiments, a set of subpixels may be illuminated to create the perception of a pattern or object that is sharp, or one that is blurred. The effect of blurring may range from unambiguous to almost indecipherable. This may be accomplished by illuminating selected subpixels at calculated positions of the LLSO as may be demonstrated, in examples, by FIGS. 7-9. In each of FIGS. 7-9, a subpixel array (702, 802, 902, in respective FIGS. 7-9) is optically disposed upstream from a rotating prism LLSO (see, e.g., FIGS. 3 and 4).

Figure 7:
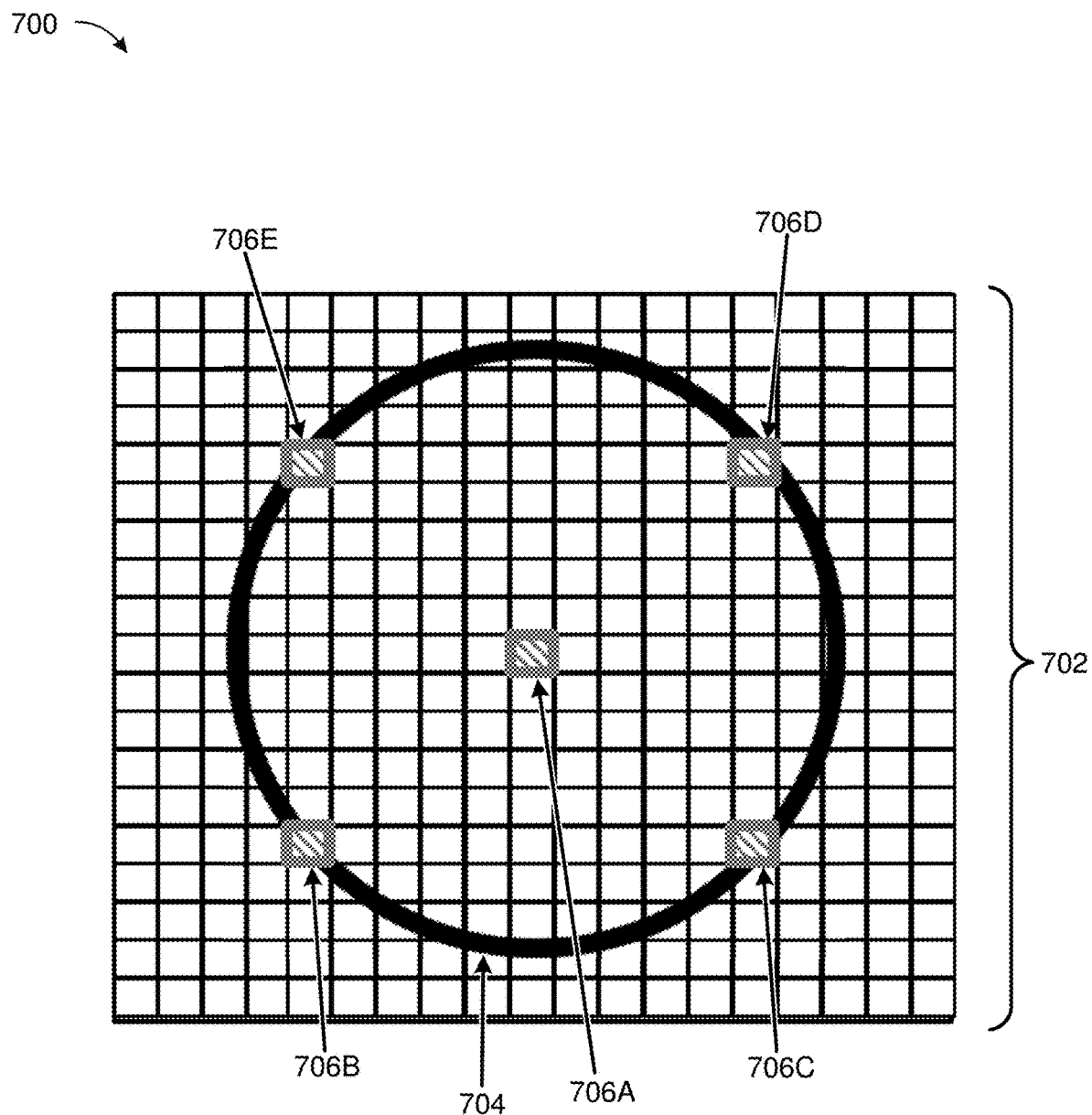
FIG. 7 is a schematic of an example subpixel array that demonstrates the effect of laterally shifting light from one subpixel to another by a rotating prism LLSO (or light deviator), in accordance with some embodiments.
Figure 8:
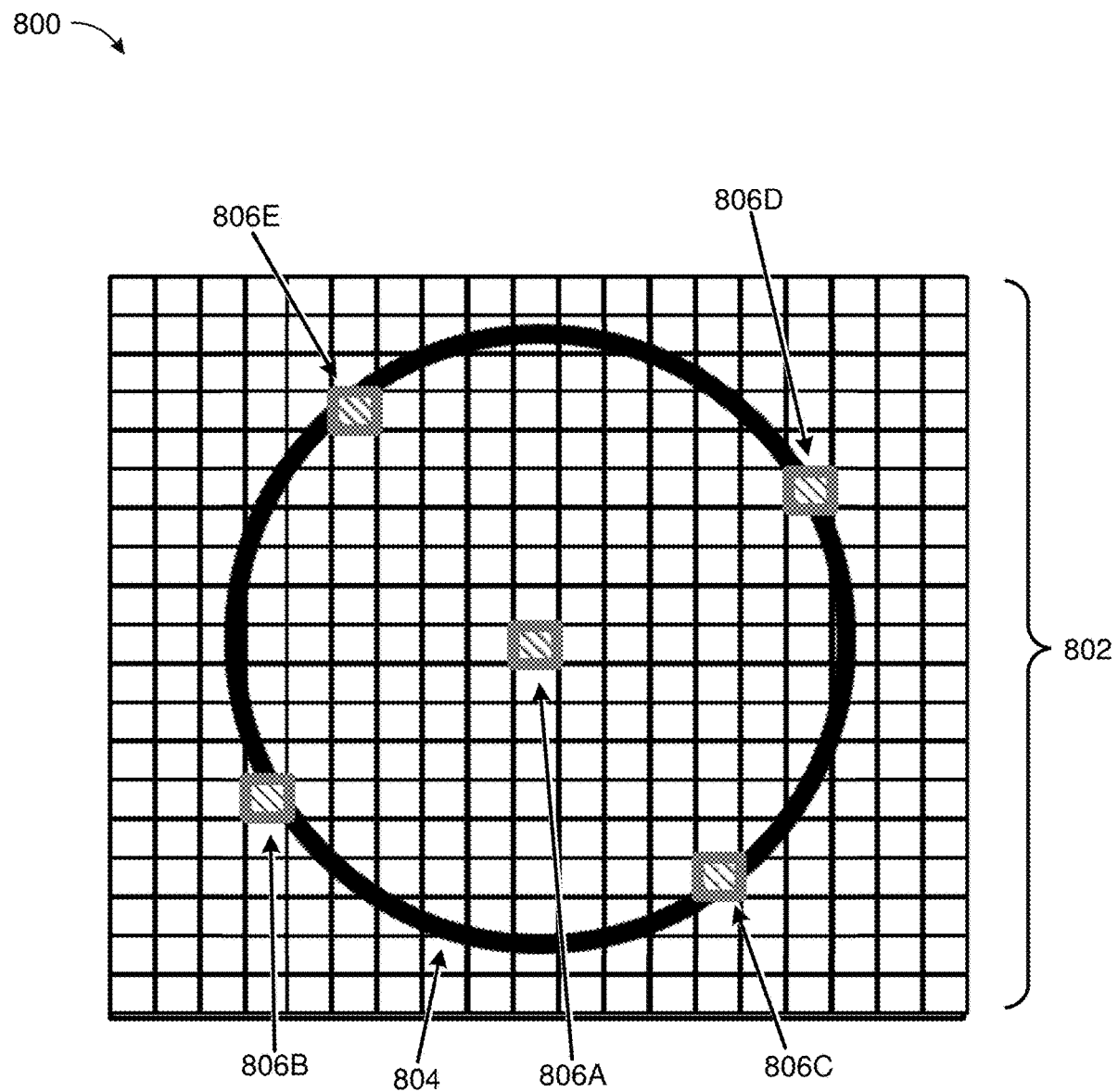
FIG. 8 is a schematic of an example subpixel array that demonstrates the effect of laterally shifting light from one subpixel to another by a rotating prism LLSO (or light deviator) in which there is a phase shift relative to that depicted in FIG. 7, in accordance with some embodiments.
Figure 9:
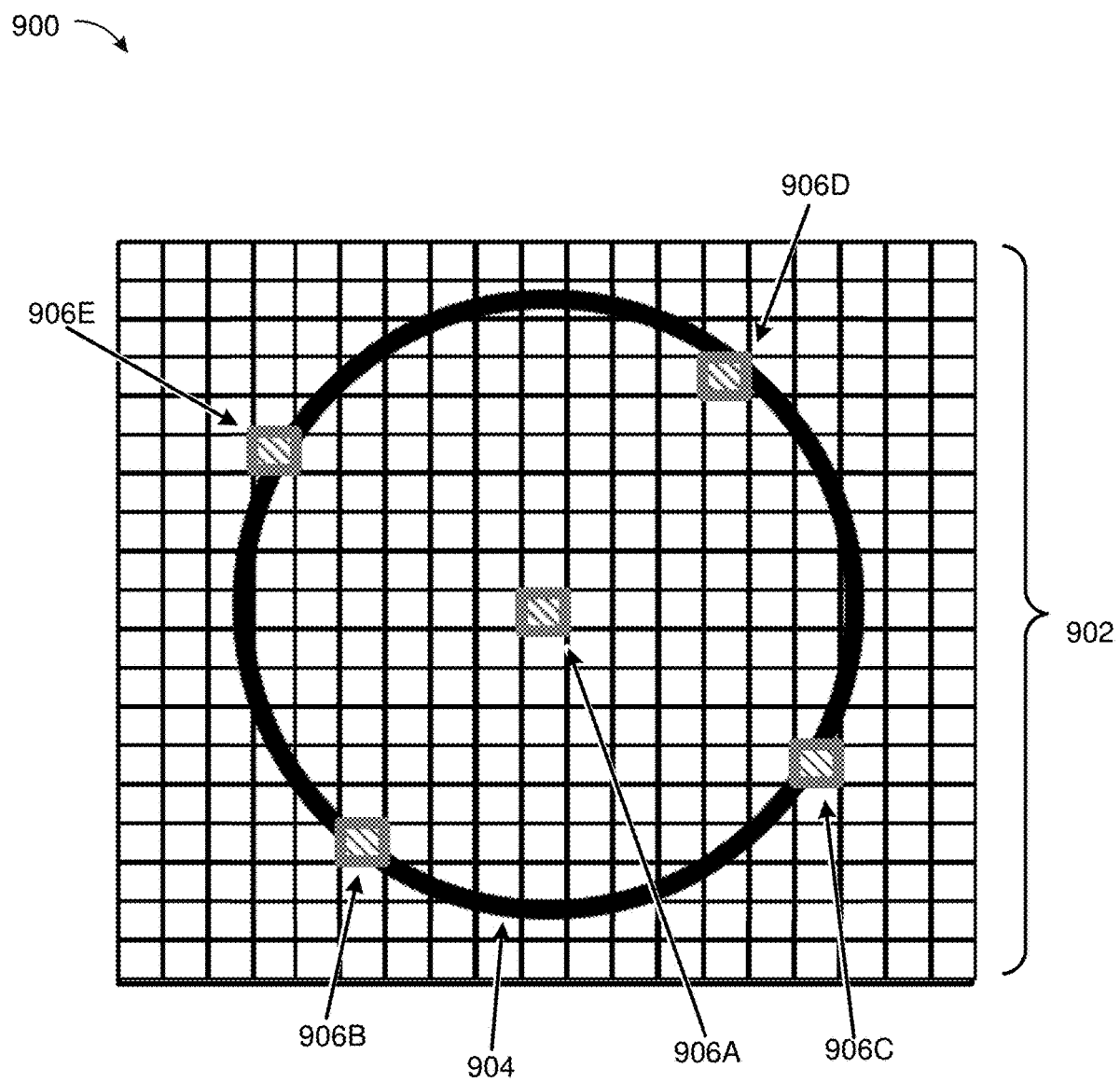
FIG. 9 is a schematic of an example subpixel array that demonstrates the effect of laterally shifting light from one subpixel to another by a rotating prism LLSO (or light deviator), in which there is a phase shift relative to that depicted in FIG. 7, in accordance with some embodiments.

In each of these figures, either a generator subpixel (706A, 806A, 906A) is illuminated at the appropriate time to illuminate a portion of the virtual curve (704, 804, 904, in respective FIGS. 7-9), or a subpixel identified on the respective virtual curve (704, 804, 904) is illuminated to make it appear as if the light of that subpixel originated at a generator point on the curve (706A, 806A, 906A, in respective FIGS. 7-9). The use of the term 'virtual' in the current context is used to indicate that the light seen by a viewer may not be light actually emitted by the subpixel at the subpixel location that the viewer actually sees. It is light that has been optically translated from one subpixel (the illuminated one or generator) to the position of another subpixel in the array (702, 802, 902) as seen by the viewer. In FIGS. 7-9, the exemplar LLSO is a rotating prism without optical power.

FIG. 7 depicts an example 700 of the effect of laterally translating light from one illuminated subpixel to a virtual location, which is associated with an actual subpixel position. The schematic 700 shows a subpixel array 702, each subpixel of which may be caused to emit light. The virtual curve 704 indicated is what a viewer may see if the subpixel 706A is illuminated during at least one entire cyclical movement of the prism LLSO.

The tactic of optically mapping the light from one subpixel to a virtual position may be also performed in the reverse direction: i.e., the translated light appears as if it originated from the subpixel 706A. In this case the virtual subpixel position may be located somewhere on the virtual curve 704 (which is actually associated with the generator subpixel 706A) and its location on the virtual curve will depend on the synchronization of the actual illuminated subpixel 706A and the position of the LLSO. In FIG. 7, the indicated positions on the virtual curve 704, namely positions 706B-706E, may be obtained when the subpixel 706A is illuminated at precise positions of the LLSO, namely, and respectively, 45°, 135°, 225°, and 315°. Illuminating 706A at LLSO positions other than these angles will lead to offsets of the generated object. Such actions may be used to create a blurred or defocused visual effect.

The parameters for this lateral translation of an image may depend on the optical characteristics of the light deviator/LLSO, and on the synchronization of the illumination of a subpixel with the cyclical and/or lateral-light-shifting speed of the LLSO. However, any of the subpixel positions 706B-706E could have been the source (i.e., generator) of the virtual illumination of the subpixel 706A.

FIG. 8 presents an alternative illumination, in which the either the indicated subpixels (806B-E) may be illuminated to give the impression that subpixel 806A has been illuminated, or the antithesis, in which subpixel 806A has been illuminated to create the impression to a viewer that one or more subpixels 806B-E have been illuminated. The phase shift between the set of subpixels 706B-E in FIG. 7, and the equivalent subpixels 806B-E in FIG. 8 is approximately +15°. FIG. 9 presents a similar arrangement as in FIGS. 7-8, in which the illumination phase difference of the subpixels 906B-E with respect to the subpixels 706B-E of FIG. 7 is approximately −10°.

According to some embodiments, sets of subframes may be generated using different relative offsets for different regions of an image. For example, some regions of the image may be meant to be displayed at 45°, 135°, 225°, and 315°; others may be meant to be displayed at 30°, 120°, 210°, and 300°; and others may be meant to be displayed at 60°, 150°, 240°, and 330°. If the array, or portions thereof, is turned on at the appropriate LLSO positions for some regions of the image, those regions may appear sharp, while the other regions may appear blurred. Levels of blur may depend on deviation from correct LLSO position; for example, if the display is turned on at 30°, the regions meant to be viewed at 60° may be blurrier than the regions meant to be viewed at 45°.

A set of illuminated generator subpixels, illuminated in a calculated fashion with respect to the calculated actions of the LLSO, may produce an image of an object; moreover, this object may have edges that appear to a viewer to be sharp. One of the parameters that creates the impression of sharpness, or being in focus, is the relative intensity of the illuminated set of subpixels with that of its local background. The lower the contrast of the illuminated set of subpixels relative to the local background, the less a viewer perceives the object to be sharp. The lowering of the intensity of the object relative to the background reaches the point where the object is indistinguishable, or almost so, from the local background. Additionally or alternatively, to create an impression that an object is not sharp in appearance to a viewer, but defocused or blurred, may be accomplished by creating several images of an object, but laterally displaced from one another using an appropriate set of incremental deviations. Moreover, the displaced objects may have varying intensities to create certain visual effects such as motion, lighting, shadows, haloes, and specular reflection and other visual effects. To achieve such visual effects, the same set of generator subpixels may be used, but this time, with sets of incremental deviations, in which at least one incremental deviation is non-zero. The sets may include distributions, sequences, and/or ranges of incremental deviations.

To create an image of the object that is extended may require creating one or more objects, perhaps with lower intensities than those used in forming sharp versions of the one or more objects and with sets and ranges of incremental deviations. This type of varied displacement, using varied incremental deviations, may then be used to create a blurred version of the one or more objects that may be centered on the first position of the one or more objects, or may be offset in a symmetric fashion about the one or more objects, or alternatively, the offsets may be in a specific direction relative to a centered object. These types of adjustments of offsets may also be used to generate entire backgrounds, as well as visual effects. Foregrounds may also be generated in this fashion. However, in this case, the amount of blurring may be reduced to a level that an object considered to be in the foreground may be in-focus.

Alternatively, the image as perceived by the viewer may be divided into planes of depth cues. A depth cue may be defined by at least one subframe. The level of the afore-discussed incremental deviations may allow for the creation of depth cues with controlled amounts of defocus or blur. Thus, the visual cues that lead to the perception of depth may be generated by choice of the level of blurring or defocus, related to one or more of the aforementioned incremental deviations.

In some embodiments, a subframe may be generated using a first set of parameters of a plurality of parameters, in which each incremental deviation in the set of deviations is zero, and an image including the subframe contains one or more objects that appear to be sharp or in-focus when viewed by a viewer. Alternatively, a subframe may be generated using an alternative set of parameters of the plurality of parameters, in which at least one incremental deviation in the set of incremental deviations is non-zero, and an image including that subframe contains one or more objects that appear to be un-sharp, blurred, and/or defocused or possesses haloes, shadows, and/or motion-like structure when viewed by a viewer.

In some embodiments, each subframe of the plurality of subframes may be generated using a unique set of parameters which include one or more sets and/or ranges of incremental deviations from any other set of parameters used to generate any other subframe in the plurality of subframes and combining the plurality of subframes into the image by temporal multiplexing.

FIGS. 10A-F present computational representations 1000 of what an image 1002 may look like to a viewer if a plurality of subframes is produced and presented to a viewer within the integration time of that viewer's eye (i.e., by temporally multiplexing). Each subframe may be composed of a set of illuminated subpixels that create one or more objects that appear either to be in-focus or out-of-focus (i.e., blurred), or anything in-between.

FIG. 10A illustrates an exemplary image 1002 in which all regions are displayed sharply in focus in accordance with at least one embodiment. Each of FIGS. 10B-F illustrate portions of the exemplary image 1002 of FIG. 10A in which some regions of exemplary image 1002 are displayed more sharply and other regions are displayed with various degrees of relative blurring using different relative offsets, or different sets of incremental deviations, in accordance with various embodiments.

In FIG. 10B, the image 1004 shows that the line with 'far' is highly blurred by a suitable choice of incremental deviations. The 'mid' line is discernable, though more blurred that the more in-focus line of 'near.' The 'near' line of the image 1004 has been created with very small or zero incremental deviations.

Alternatively, in FIG. 10C, all of the three lines are easily discernable in this image 1006, as the extent of the incremental deviations that generated the 'far' line are less than the set of incremental deviations that created the 'far' line in the image 1004. Also, in FIG. 10C, the 'mid' line in the image 1006 appears in-focus, while the 'near line' has received some blurring due to small, but non-zero incremental deviations in its creation.

In FIG. 10D, FIG. 10E, and FIG. 10F, various sets of incremental deviations have been applied to generated levels of sharpness (such as the 'far' line in image 1008; the 'mid' and 'near' lines in image 1010; and the 'far' line in image 1012), levels of intermediate blur or fuzziness ('mid' line of 1008 and 'mid' line of 1010), and levels which render the associated lines of text virtually indecipherable ('near' lines of 1008 and 1012 and 'far' line of 1010).

In some embodiments, the incremental deviations may be so generated such that the "mid" image regions may, for example, be shifted 5 pixels per subframe (e.g., right, then down, then left, then up to return to start). The "far" image regions may, for example, be shifted (from a position during a first subframe) 5 pixels right and 1 pixel down during a second subframe, then 5 pixels down and 1 pixel left during a third subframe, then 5 pixels left and 1 pixel up during a fourth subframe. The "near" image regions may, for example, be shifted (from a position during a first subframe) 1 pixel up and 5 pixels right during a second subframe, then 1 pixel right and 5 pixels down during a third subframe, then 1 pixel down and 5 pixels left during a fourth subframe.

An image may be represented by a set of subframes $SF_j$. Each subframe may be generated by illuminating a set of subpixels using a set of predetermined parameters derived from processing a set of input data which may lead to displaying an image via temporal multiplexing to a viewer. Input data to a controller (e.g., controller 320 in FIG. 3) may include an image, instructions for generating an image, or portions thereof, a computer-generated model, or a sequence of images such as might be found in an animated GIF, for example. The image format may be a bitmap, a jpg, a png, a svg, tiff, or any other suitable pixel formatted image or data.

Each subframe $SF_j$ may be derived from $SF_j = \Sigma_i^{N_j} f(p_{ij} + \Delta p_{ij}, t_{ij} + \Delta t_{ij}, I_{ij}, D_{ij}, x_{ij} + \Delta x_{ij}, y_{ij} + \Delta y_{ij})$, where $SF_j$ is the j-th subframe, including a set of $N_j$ subpixels, each i-th subpixel of the $N_j$ subpixels to be illuminated for $SF_j$; where $f$ is a function that represents the various functions of the controller (e.g., controller 320 in FIG. 3), which includes LLSO positioning for the i-th subpixel and illumination of the i-th subpixel using a plurality of parameters. The parameters for the j-th subframe may include: $t_{ij}$=time when the i-th subpixel is illuminated; $D_{ij}$=duration of the i-th subpixel illumination; $(x_{ij}, y_{ij})$ identifies the i-th subpixel by its location within the subpixel array; $I_{ii}$=intensity of the i-th subpixel illumination; $p_{ij}$=position of the LLSO for the i-th subpixel; and a set of incremental deviations of the plurality of parameters, the incremental deviations include: $\Delta t_{ij}$=incremental deviation from the time at which the i-th subpixel is illuminated; $\Delta x_{ij}, \Delta y_{ij}$ are incremental deviations defining positional offsets from the i-th subpixel; and $\Delta p_{ij}$=light deviator/LLSO incremental position deviations for the i-th subpixel. The plurality of parameters may be represented as components of a vector $q_{ij}$, and the vector $q_{ij}$ would be at least one of the arguments of the function $f$.

In some embodiments, the positional parameter $p_{ij}$ may have a component related to the rotational or cyclical position of the LLSO, or other time-periodic parameters of the LLSO. In some embodiments, one or more components of the position vector (e.g., the component $p^k_{ij}$) may be cyclical and thus have a period $c^k$ associated with each k-th cyclical component of $p_{ij}$. In alternative or additional embodiments, the rate of change of any LLSO positional component may be controlled by the controller (e.g., controller 320 in FIG. 3). This may allow for greater efficiency in compensating for sub-standard subpixels in that a greater number of compensations may occur within a preset number of subframes. Other, perhaps non-cyclical, positions of the light deviator/LLSO may be represented by one or more components of $p_{ij}$. The ensemble of positional parameters may be formalized as a vector, where each degree of freedom of the light deviator/LLSO is represented by a component in that vector.

In summary, functions of the array system may include at least: subpixels addressable, illumination of subpixels, and/or duration of subpixel illumination. Optical system functions may include at least: lateral translocation of light, rotation (e.g., rotational position and/or speed), tilt, pivot, reflection control, varifocal adjustment, focus adjustment of light from the array to downstream optics, eye tracking, waveguide control, foveated rendering of one or more images based on eye tracking information, electro-optical deformable surface adjustment, manipulation of individual optical elements in 3D, lateral shifting of the subpixel array, and/or lateral and/or axial shifting of any optical component.

Additionally or alternatively, the described embodiments may be used in conjunction with temporally-multiplexed resolution enhancement and/or redundancy. For example, the same process of splitting images into multiple subframes may be used in various optical applications described herein and the subframe adjustments necessary for each application may be mutually compatible. The subframes of an image may be projected towards a viewer within the integration time of a typical eye, and thus the combination of the information contained in each subframe may appear to be associated with an image. Any suitable number of subframes may be utilized and may range, for example, from one to approximately 32.

A system may be so designed as to generate an image to be viewed by a viewer. Such a system may include a subpixel array system including a plurality of subpixels and an optical system, which may be designed to receive light from at least one subpixel of the subpixel array system and shift laterally the received light by a light deviator/LLSO, and to direct the laterally shifted light towards a viewer. The system may also include a controller, which receives and converts input data into a sequence of instructions to cause the generation of one or more subframes by controlling a plurality of functions of the subpixel array system and of the optical system, each of the one or more subframes including light from a set of subpixels of the plurality of subpixels emitted at a predetermined time and at a predetermined position of the LLSO with respect to at least one of the lateral-light-shifting degrees of freedom of the light deviator/LLSO. An image may then be generated in the visual cortex of a viewer by one or more of the techniques of temporal multiplexing described herein.

Techniques of temporal multiplexing of a display or an array of subpixels may involve creating the impression of an image by rapidly overlapping a sequence of subframes. Such may also include the technique of interlacing, wobulation, and field sequential color. Interlacing is a technique that displays half of the lines of an image in a subframe and the other half in a subsequent subframe. Wobulation is a technique that divides high-resolution images into two half-resolution subframes that may be overlapped with a half-pixel offset. Field-sequential color may segregate the image into monochromatic subframes which may then displayed. In addition to these, an alternative or additional technique is sequential presentation of the subframes to the display.

Figure 11:
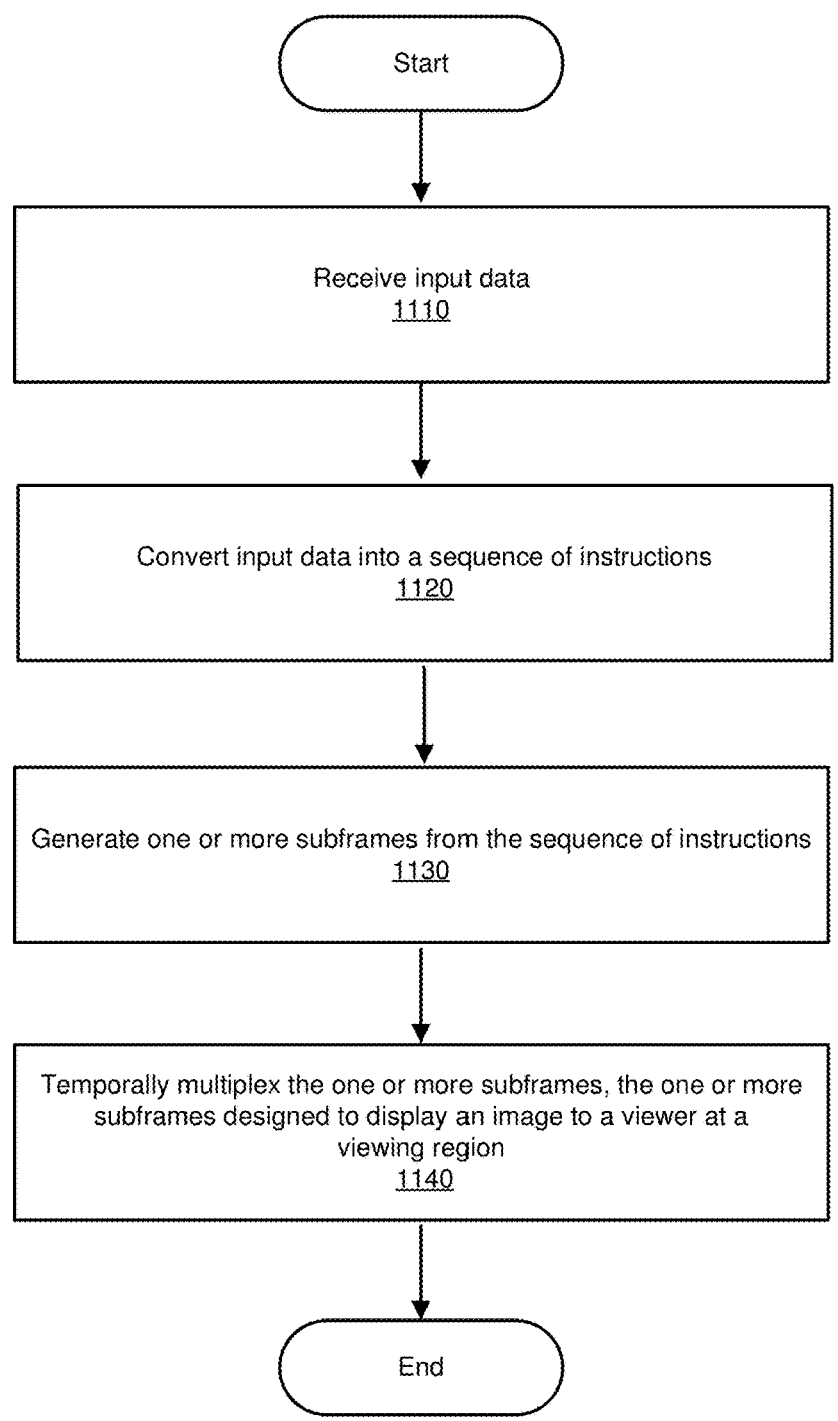
FIG. 11 is a flow diagram of an example method for generating temporally multiplexed images, in accordance with some embodiments.

FIG. 11 is a flow diagram of an exemplary method 1100 of generating an image to be viewed by a viewer in accordance with various embodiments. The steps in FIG. 11 may be performed by any executable code and/or computing device or by hardware in the form of circuitries, including the system 150 in FIG. 12. In at least one embodiment, at step 1110, input data may be received by a controller and may then be converted, at step 1120, by the controller into a sequence of instructions to control a plurality of functions of an array system and of an optical system (e.g., to control the illumination of subpixels simultaneous with positioning of an LLSO). The sequence of instructions may be used to generate, at step 1130, one or more subframes in accordance with various embodiments described herein. These subframes may represent the functions of the controller which include the functions of the array system and the functions of the optical system. Such functions may include at least the time, duration, and intensity of a subpixel to be illuminated, and also the position of one or more components of the optical system (e.g., an LLSO) at the time that subpixel is caused to emit light. The ensemble of these one or more subframes may yield a representation of an image. At step 1140, the one or more subframes may be temporally multiplexed in accordance with various embodiments described herein. The one or more subframes may be designed to display an image to a viewer at a viewing region (e.g., viewing region 106 in FIG. 1 and/or eye box 225 in FIG. 2).

Figure 12:
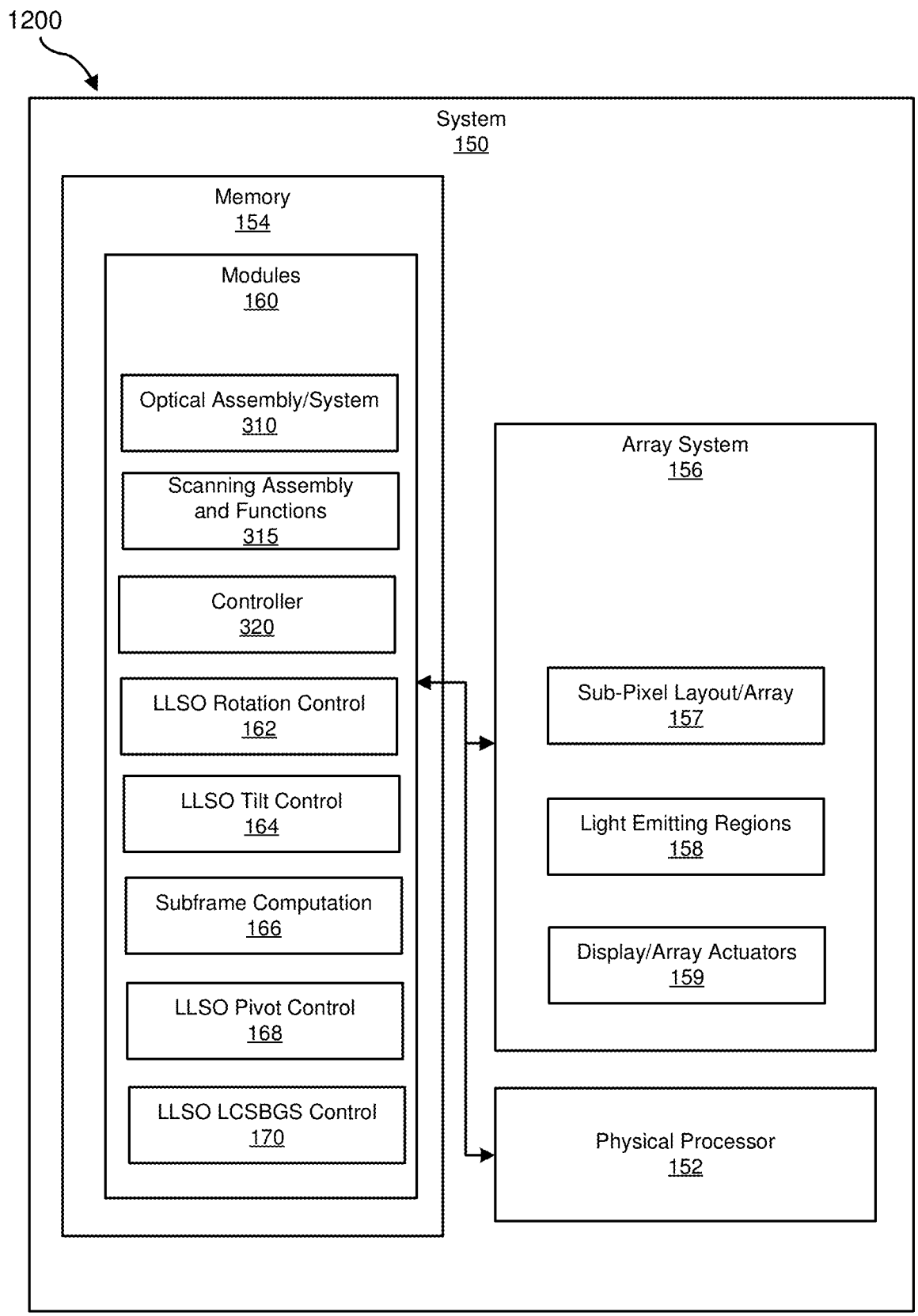
FIG. 12 is a block diagram of an example system suitable for implementing the disclosed generation of temporally multiplexed image, in accordance with some embodiments.

Block diagram 1200 of FIG. 12 presents an exemplary system 150 that includes a physical processor 152. The system 150 may also include one or more modules 160 for performing one or more functions, tasks, and/or actions as disclosed herein. Additionally, system 150 may include an array system 156, which may include several exemplary modules to perform various functions, tasks, and/or actions. Such exemplary modules in array system 156 may include one or more of subpixel layout/array 157, light-emitting regions 158, and/or array actuators 159. The exemplary modules of system 150, if implemented in a computing device, may be resident in memory 154 of that computing device. Alternatively, one or more of the modules may be implemented in circuitry.

Exemplary modules 160 in FIG. 12 may include one or more modules that performs various functions/actions/tasks such as optical assembly/system 310, scanning assembly 315, and one or more controllers 320 for various subsystems such as one or more LLSOs as described herein. Such subsystems may include LLSO rotation control 162, LLSO tilt control 164, LLSO pivot control 168, LLSO LCSBGS (liquid crystal switchable blazed grating stack) control 170, scanning functions 315, and subframe computations 166. Subframe computations 166 may be performed prior to any projection/array activity and/or any of the functions of any other of the modules 160 and/or 156. Thus, the exemplary controller and its subsystems, may generate instructions to other modules, such as the aforementioned, to perform their functions and/or actions at the designated time. The controller may cause functions/actions of the various modules in system 150 to temporally multiplex the subframes generated from the subframe computations module 166 towards a viewer using one or more components of the optical system 310 and of the array system 156 to present an image to be perceived by a viewer.

The described devices, systems, and methods may allow for any suitable temporal subpixel averaging, enabling an increased range of colors to be displayed without sacrificing resolution or increasing the subpixel array area. Additionally, the disclosed devices, systems, and methods may enable subpixel array resolution to be enhanced using a movable color selector layer and/or LLSO that enables each subpixel location to function as a pixel emitting various colors that may be averaged temporally. Thus, a reference, in the present disclosure, to a pixel may include the components of that pixel, the various subpixels. Each pixel may include subpixels that may be operable to emit a white light when illuminated together. Alternatively or additionally, at least one of the subpixels may emit light that, when viewed by a human agent, appears to be white. Furthermore, each color of subpixel may lie on a circular path such that a circular translation may allow each color subpixel to appear in the same location. In some examples, a color selector layer may move while the light source remains stationary.

Embodiments of the present disclosure relate to apparatus and methods for manipulating the direction of light emitted from subpixels in a subpixel array to apparent locations of other subpixels in that array by laterally shifting the emitted light. Such lateral shifting may aid in increasing the brightness of the apparent subpixel. Additionally or alternatively, the color of an apparent subpixel may be altered by combining laterally shifted light from other subpixels operable to emit light of varying colors and/or intensities. Such lateral shifting of light may also permit, in some embodiments, the ability to create an image that possesses a depth of focus. This may allow for the creation of more realistic images containing objects with varying degrees of sharpness (i.e., in or out of focus) and thus control of the perception of depth without, for example, the necessity of modifying the image. Additionally or alternatively, selective blurring and/or or sharpening of various portions of images may be used to draw a viewer's attention to desired regions of the images and/or to reduce distracting or extraneous image objects in the user's field of view. Such image adjustments affecting the displayed images may be accomplished without, for example, necessitating additional and/or unnecessary modifications to image data supplied to the system.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices may include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors may include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media may include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that may be used to, e.g., create content in an artificial reality and/or may be otherwise used in (e.g., perform activities in) an artificial reality. The artificial reality system that provides the artificial reality content may be implemented on various platforms, including a head-mounted array (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or may include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system for generating a temporally multiplexed image, the system comprising:
   an array system comprising a plurality of subpixels in the form of an array;
   an optical system that:
      receives light from at least one illuminated subpixel of the array system;
      shifts laterally the received light by a light deviator; and
      directs the laterally shifted light towards a viewing region; and
   a controller that:
      receives input data;
      converts the input data into a sequence of instructions to control a plurality of functions of the array system and of the optical system, the sequence of instructions for each subframe causing at least a subset of subpixels of the plurality of subpixels to be illuminated at a predetermined time and at a predetermined position of the light deviator, the light deviator comprising at least one lateral-light-shifting degree of freedom;

generates, from the sequence of instructions, at least a first subframe and a second subframe, wherein the first subframe is generated while the light deviator is oriented in a first specified rotational position to generate an unaltered portion of an image to a viewer at the viewing region and the second subframe is generated while the light deviator is oriented in a second, different rotational position to generate an altered portion of the image at the viewing region; and temporally multiplexes the one or more subframes using the optical system, the one or more subframes designed to display an image to a viewer at the viewing region.

2. The system of claim 1, wherein the one or more subframes are generated by the following representation:

$$SF_j = \Sigma_i^{N_j} f(q_{ij}),$$

where $SF_j$ is the j-th subframe, comprising a set of $N_j$ subpixels, each i-th subpixel of the subpixels to be illuminated for $SF_j$, where $f$ is a function comprising the plurality of functions of the controller and $q_{ij}$ is a vector that comprises a plurality of parameters to form a subframe.

3. The system of claim 2, wherein the plurality of parameters for the j-th subframe comprise:
$t_{ij}$=time when the i-th subpixel is illuminated;
$D_{ij}$=duration of the i-th subpixel illumination;
$(x_{ij}, y_{ij})$=location of i-th subpixel within the array;
$I_{ij}$=intensity of the i-th subpixel illumination;
$p_{ij}$=position of the light deviator for the i-th subpixel; and
a set of incremental deviations of the plurality of parameters, the incremental deviations comprising:
$\Delta t_{ij}$=time deviation which the i-th subpixel is illuminated;
$\Delta x_{ij}, \Delta y_{ij}$=position deviations from the i-th subpixel; and
$\Delta p_{ij}$=position deviations of the light deviator for the i-th subpixel.

4. The system of claim 3, wherein $t_{ij}$ comprises a periodic function of $p^k_{ij}$, wherein $p^k_{ij}$ is a cyclical component of $p_{ij}$ with a periodicity of $c^k$.

5. The system of claim 3, wherein:
a subframe of the one or more subframes is generated using a first set of parameters of the plurality of parameters, and
each incremental deviation in the first set of parameters is zero and the image comprising the subframe contains one or more objects that are designed to be perceived to be sharp when viewed by the viewer.

6. The system of claim 3, wherein a subframe of the one or more subframes is generated using a second set of parameters of the plurality of parameters, and wherein at least one incremental deviation in the second set of parameters is non-zero and the image comprising the subframe contains one or more objects that are designed to be perceived to be blurred when viewed by the viewer.

7. The system of claim 3, wherein each subframe of the one or more subframes is generated with a unique set of the plurality of parameters.

8. The system of claim 1, wherein the temporally multiplexed image is designed to be perceived by the viewer to have a plurality of depth cues.

9. The system of claim 1, wherein light from one or more subpixels of a first set of subpixels of the plurality of subpixels is laterally directed to positions of each subpixel of a second set of subpixels of the plurality of subpixels.

10. The system of claim 9, wherein the light from the one or more subpixels of the first set of subpixels augments at least one of intensity or color of light emitted from each of the subpixels of the second set of subpixels.

11. A system for generating a temporally multiplexed image, the system comprising:
an array system comprising a plurality of subpixels in the form of an array;
an optical system that:
receives light from illuminated subpixels of the array system;
shifts laterally the received light by a rotating light deviator such that directions in which the received light is shifted correspond to rotational positions of the light deviator; and
directs the laterally shifted light towards a viewing region; and
a controller that:
receives input data for generating an image; and
converts the input data into a sequence of instructions to direct the array system and the optical system to:
generate a first set of subframes while the light deviator is respectively oriented in a first set of specified rotational positions by illuminating a first group of subpixels of the array system during the first set of subframes to generate an unaltered portion of the image at the viewing region; and
generate a second set of subframes while the light deviator is respectively oriented in a second set of specified rotational positions by illuminating a second group of subpixels of the array system during the second set of subframes to generate an altered portion of the image at the viewing region.

12. The system of claim 11, wherein the altered portion of the image includes one or more objects that are designed to be perceived to be at least one of blurred or out-of-focus when viewed by a viewer.

13. The system of claim 11, wherein the unaltered portion of the image includes one or more objects that are designed to be perceived to be sharp when viewed by a viewer.

14. The system of claim 11, wherein light received by the optical system from each of the first group of subpixels of the array system during the first set of subframes is laterally shifted by the light deviator to a first group of subpixel positions designated for reproducing corresponding portions of the image without visual alteration when viewed by a viewer.

15. The system of claim 14, wherein light received by the optical system from each of the second group of subpixels of the array system during the second set of subframes is laterally shifted by the light deviator away from a second group of subpixel positions designated by the controller for reproducing corresponding portions of the image without visual alteration when viewed by the viewer.

16. The system of claim 14, wherein the light laterally shifted to each of the first group of subpixel positions by the light deviator includes light received by the optical system from a plurality of subpixels of the first group of subpixels of the array system.

17. A method for generating a temporally multiplexed image, the method comprising:
- receiving input data by a controller;
- converting the input data into a sequence of instructions by the controller to control a plurality of functions of an array system and of an optical system, the array system comprising a plurality of subpixels in the form of an array, and the optical system comprising at least a light deviator with at least one lateral-light-shifting degree of freedom;
- generating one or more subframes from the sequence of instructions, the sequence of instructions causing, for each subframe, a subset of subpixels of the plurality of subpixels to be illuminated at least at a predetermined time and at predetermined position of the light deviator of the optical system; and
- temporally multiplexing the one or more subframes using the optical system, the one or more subframes designed to display an image to a viewer at a viewing region,
- wherein the one or more subframes are generated by the following representation:

$$SF_j = \Sigma_i^{N_j} f(q_{ij}),$$

where $SF_j$ is the j-th subframe, comprising a set of $N_j$ subpixels, each i-th subpixel of the $N_j$ subpixels to be illuminated for $SF_j$, and where $f$ is a function comprising the plurality of functions of the controller and $q_{ij}$ is a vector that comprises a plurality of input parameters to form a subframe.

18. The method of claim 17, wherein the vector $q_{ij}$, comprises one or more of the following:

$t_{ij}$=time when the i-th subpixel is illuminated;
$D_{ij}$=duration of the i-th subpixel illumination;
$(x_{ij},y_{ij})$=location of i-th subpixel within the array;
$I_{ij}$=intensity of the i-th subpixel illumination;
$p_{ij}$=plurality of positions of the light deviator for the i-th subpixel; and
a set of incremental deviations of the plurality of parameters, the incremental deviations comprising:
  $\Delta t_{ij}$=time deviation which the i-th subpixel is illuminated;
  $\Delta x_{ij}, \Delta y_{ij}$=position deviations from the i-th subpixel; and
  $\Delta p_{ij}$=position deviations of the light deviator for the i-th subpixel.

19. The method of claim 18, wherein:
a subframe of the one or more subframes is generated using a second set of parameters of the plurality of parameters; and
wherein at least one incremental deviation of second set of parameters is non-zero, and the image comprising the subframe contains one or more objects that are designed to be perceived to be blurred when viewed by the viewer.

20. The method of claim 17, wherein the temporally multiplexed image is designed to be perceived by the viewer to have a plurality of depth cues.

21. The method of claim 17, wherein light from one or more subpixels of a first set of subpixels of the plurality of subpixels is laterally directed to positions of each subpixel of a second set of subpixels of the plurality of subpixels.

* * * * *